United States Patent [19]

Conger et al.

[11] 4,354,248
[45] Oct. 12, 1982

[54] PROGRAMMABLE MULTIFREQUENCY TONE RECEIVER

[75] Inventors: David R. L. Conger, Palo Alto, Calif.; Ira A. Gerson, Hoffman Estates; Richard E. White, Schaumburg, both of Ill.

[73] Assignee: Motorola, Inc., Schaumburg, Ill.

[21] Appl. No.: 98,093

[22] Filed: Nov. 28, 1979

[51] Int. Cl.³ ............................................... G06F 15/31
[52] U.S. Cl. ................................................. 364/724
[58] Field of Search .................... 364/724; 375/103; 370/19, 70, 110

[56] References Cited

U.S. PATENT DOCUMENTS

| | | | |
|---|---|---|---|
| 3,665,171 | 5/1972 | Morrow | 364/724 |
| 3,689,844 | 9/1972 | Buzzard et al. | 375/103 X |
| 3,706,076 | 12/1972 | Schuster | 364/724 |
| 3,777,130 | 12/1973 | Crossier et al. | 364/724 |
| 3,798,560 | 3/1974 | Taylor | 328/167 |
| 3,822,404 | 7/1974 | Crossier et al. | 364/724 |
| 3,824,471 | 7/1974 | Mills | 375/25 |
| 3,863,030 | 1/1975 | Mills | 370/110 |
| 3,961,167 | 6/1976 | Mills | 364/724 |
| 4,044,241 | 8/1977 | Hatley, Jr. | 364/724 |
| 4,093,989 | 6/1978 | Flink et al. | 364/485 |
| 4,101,964 | 7/1978 | Betts | 375/34 X |
| 4,109,109 | 8/1978 | Molleron | 370/110 |
| 4,125,900 | 11/1978 | Betts | 364/724 |
| 4,127,846 | 11/1978 | Mori et al. | 340/171 PF |
| 4,136,398 | 1/1979 | Eggermont | 364/724 |
| 4,146,931 | 3/1979 | Delforge | 364/724 |
| 4,149,258 | 4/1979 | Yahata | 364/724 |
| 4,157,457 | 6/1979 | Sakoe et al. | 179/1 SA |
| 4,203,008 | 5/1980 | Cohn-Sfeteu et al. | 364/724 X |
| 4,204,177 | 5/1980 | Eggermont | 333/166 |
| 4,213,187 | 7/1980 | Lawrence et al. | 364/724 |
| 4,223,389 | 9/1980 | Amada et al. | 364/724 |

OTHER PUBLICATIONS

Peled "A New Hardware Realization of Digital Filters" *IEEE Trans. on Acoustics, Speech & Signal Processing*, Dec. 1974, pp. 456-462.
Freeny "Special-Purpose Hardware for Digital Filtering" *Proceeding of the IEEE* vol. 63, No. 4, Apr. 1975. pp. 633-648.
Mills "Digital MF Receiver Technique" *Automatic Electric Journal* vol. 15, No. 7, May 1977, pp. 317-325.
Jackson et al., "An Approach to the Implementation of Digital Filters" *IEEE Trans. on Audio and Electroacoustics* vol. AU-16, No. 3, Sep. 1968, pp. 413-421.

*Primary Examiner*—David H. Malzahn
*Attorney, Agent, or Firm*—Rolland R. Hackbart; James W. Gillman

[57] ABSTRACT

A multifrequency tone receiver is disclosed for detecting simultaneous tone signals in a sampled digital signal. The tone receiver includes a microprogrammed sequence controller, a time-multiplexed digital filter and a signal processing microcomputer. For each sample of the digital signal, the sequence controller is programmed to time multiplex the digital filter for performing three cascaded second order filtering operations (two bandpass filter operations and one low pass filter operation) for each of six tone signals to provide corresponding energy estimates and one additioal filtering operation to provide a total energy estimate. The signal processing microcomputer processes a number of sets of the seven energy estimates and provides an indication when a multifrequency toner pair has been detected. The digital filter, when enabled by a filter start signal from the sequence controller, asynchronously performs a single multiplication-like filtering operation to implement each second-order filter, and provides a filter done signal upon completion of the filtering operation. Full-wave rectifying capability is provided during low pass filtering operations by logically complementing the digital filter input signal. Limit cycles may be suppressed in the digital filter output signal by rounding the output signal and clamping positive and negative overflows to the largest allowable positive and negative signals, respectively. The tone receiver may be advantageously utilized in a PCM communication system for detecting multifrequency tone signalling used for dialing and supervisory control. Moreover, the inventive tone reciver may be adapted to receive many different types of tone signalling simply by changing firmware therewithin.

51 Claims, 10 Drawing Figures

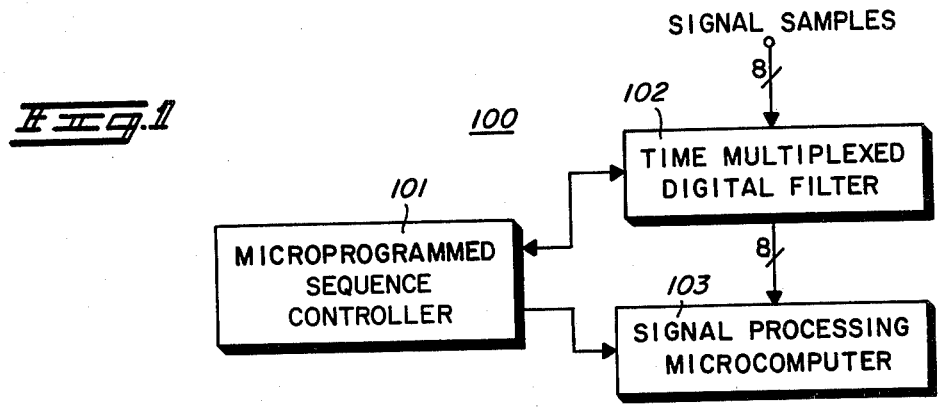
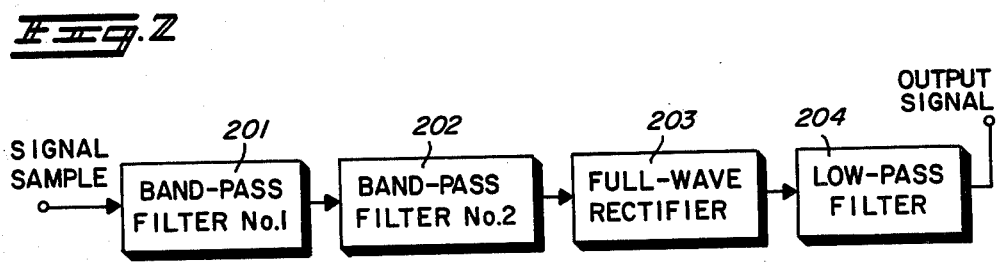
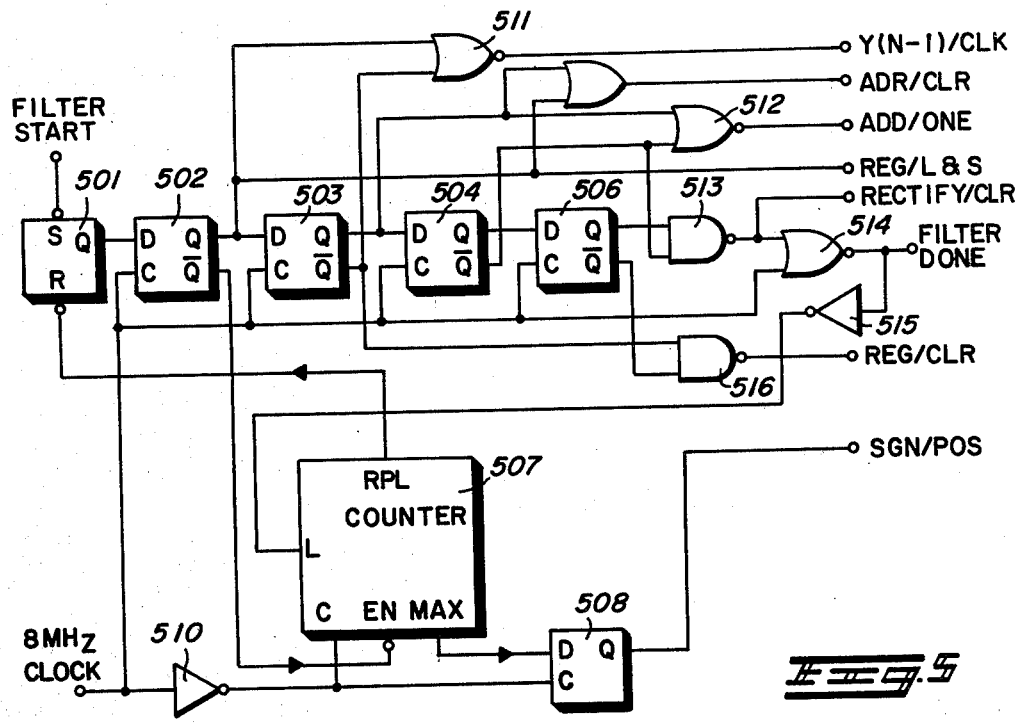

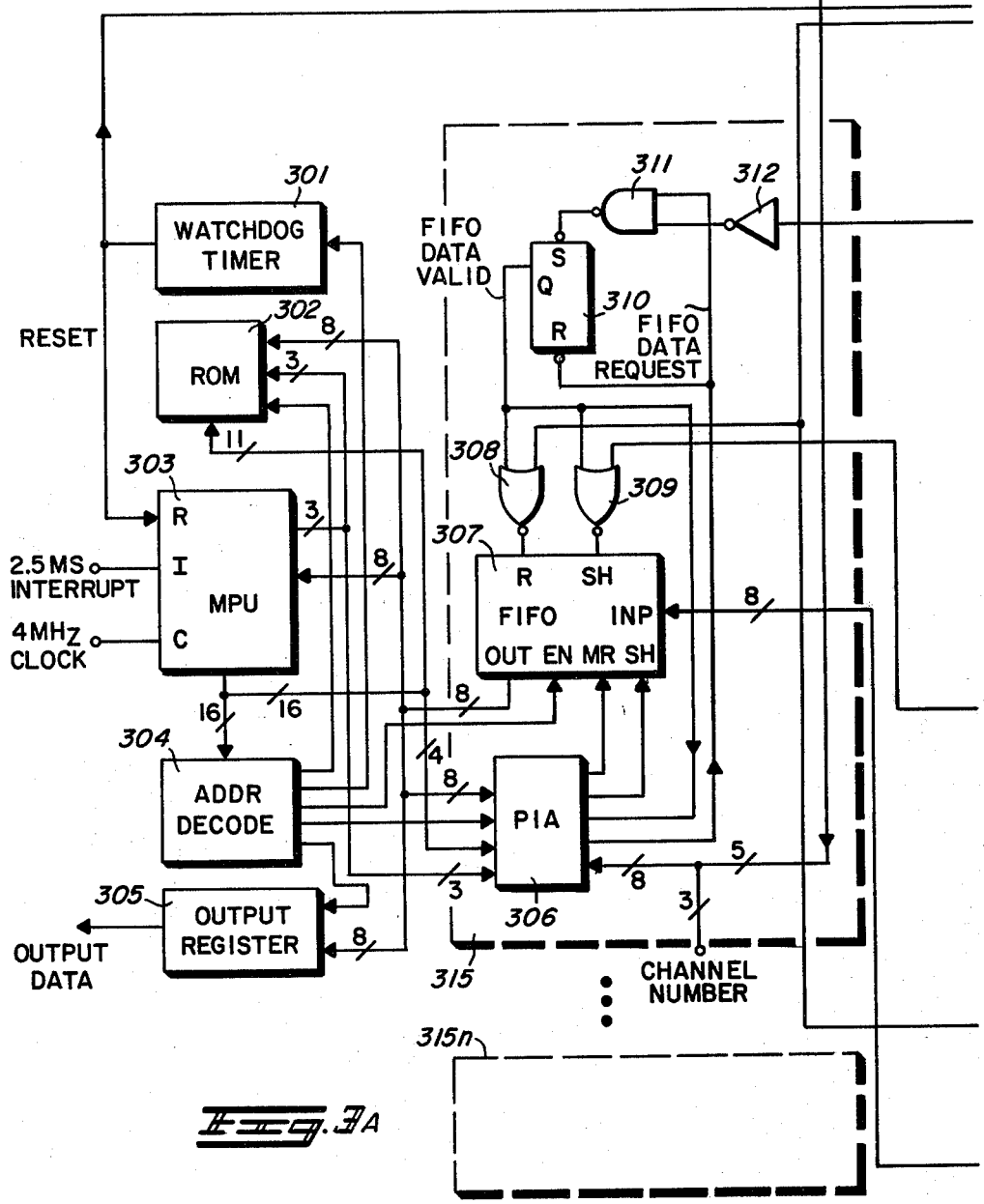

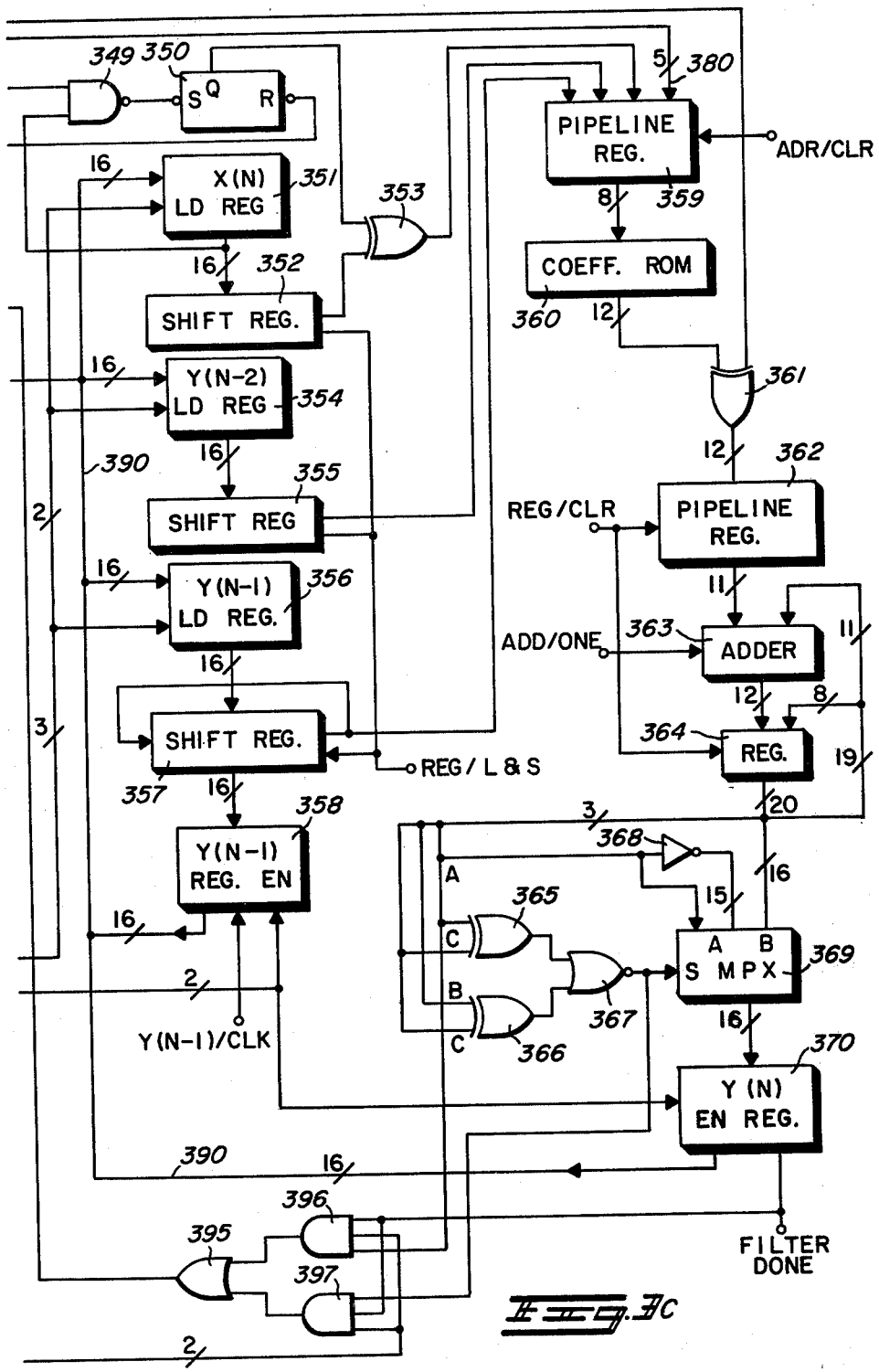

| FIELD | BIT | FUNCTION |
|---|---|---|
| DATA BUS CONTROL FIELD<br><br>SOURCE<br><br>CODE-UPPER<br><br>DESTINATION | 1 | PCM INPUT REGISTER ENABLE |
| | 2 | PARTIAL RESULTS RAM ENABLE |
| | 3 | Y(N) RESULT REGISTER ENABLE |
| | 4 | Y(N-1) RESULT REGISTER ENABLE |
| | 5 | X(N) INPUT REGISTER LOAD |
| | 6 | Y(N-1) INPUT REGISTER LOAD |
| | 7 | Y(N-2) INPUT REGISTER LOAD |
| | 8 | PARTIAL RESULTS RAM LOAD |
| SEQUENCE AND FILTER CONTROL FIELD<br><br>CODE-LOWER | 9 | RESET |
| | 10 | HALT |
| | 11 | LONG/SHORT INSTRUCTION |
| | 12 | FIFO LOAD |
| | 13 | SPARE No. 2 |
| | 14 | SPARE No. 1 |
| | 15 | RECTIFY X(N) INPUT |
| | 16 | FILTER START |
| PARTIAL RESULTS RAM AND COEFFICIENT ROM ADDRESSING FIELD<br><br>CODE-ADDRESS | 17 | MSB OF ADDRESS |
| | 18 | |
| | 19 | |
| | 20 | |
| | 21 | |
| | 22 | |
| | 23 | |
| | 24 | LSB OF ADDRESS |

Fig. 4

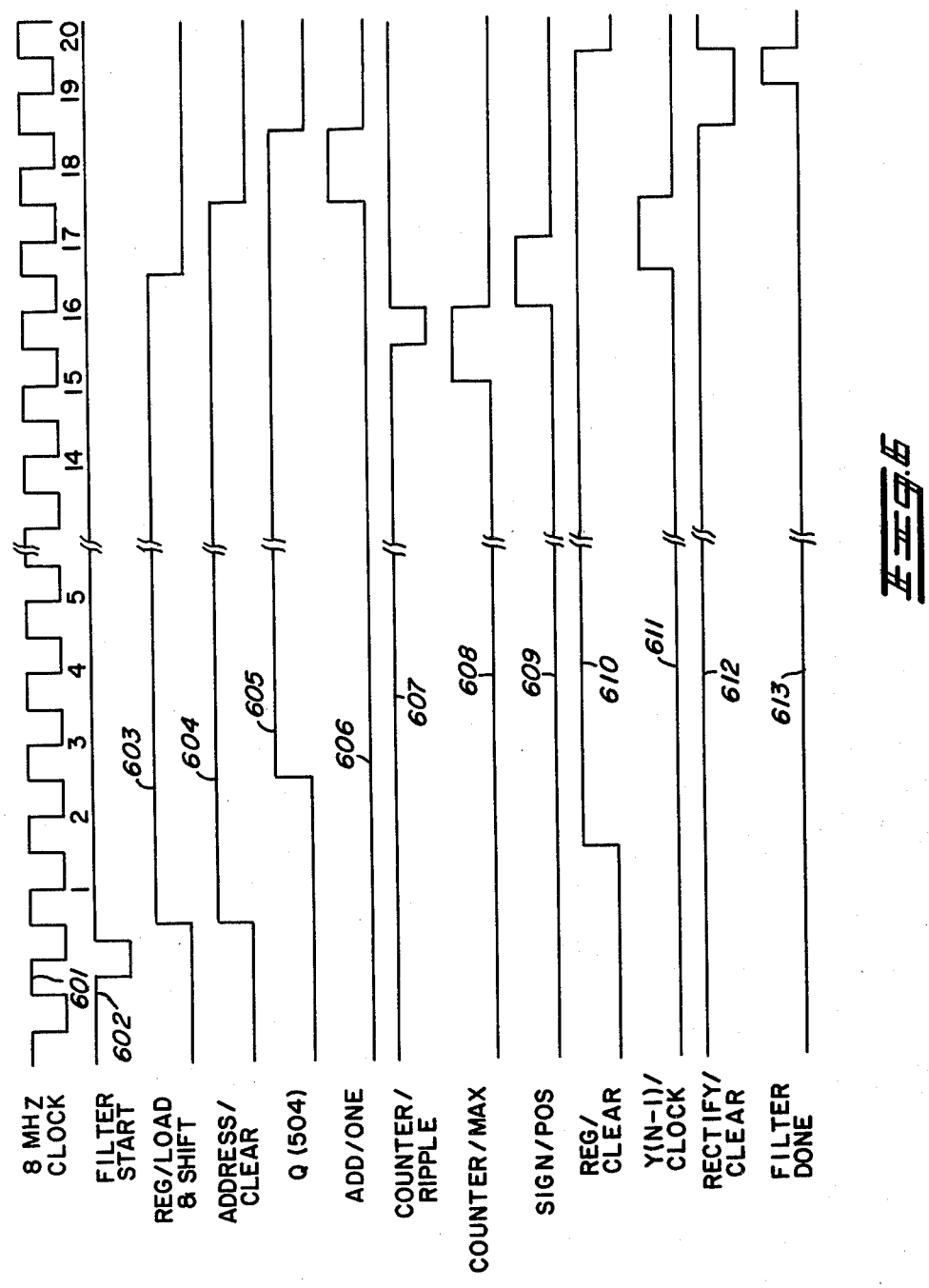

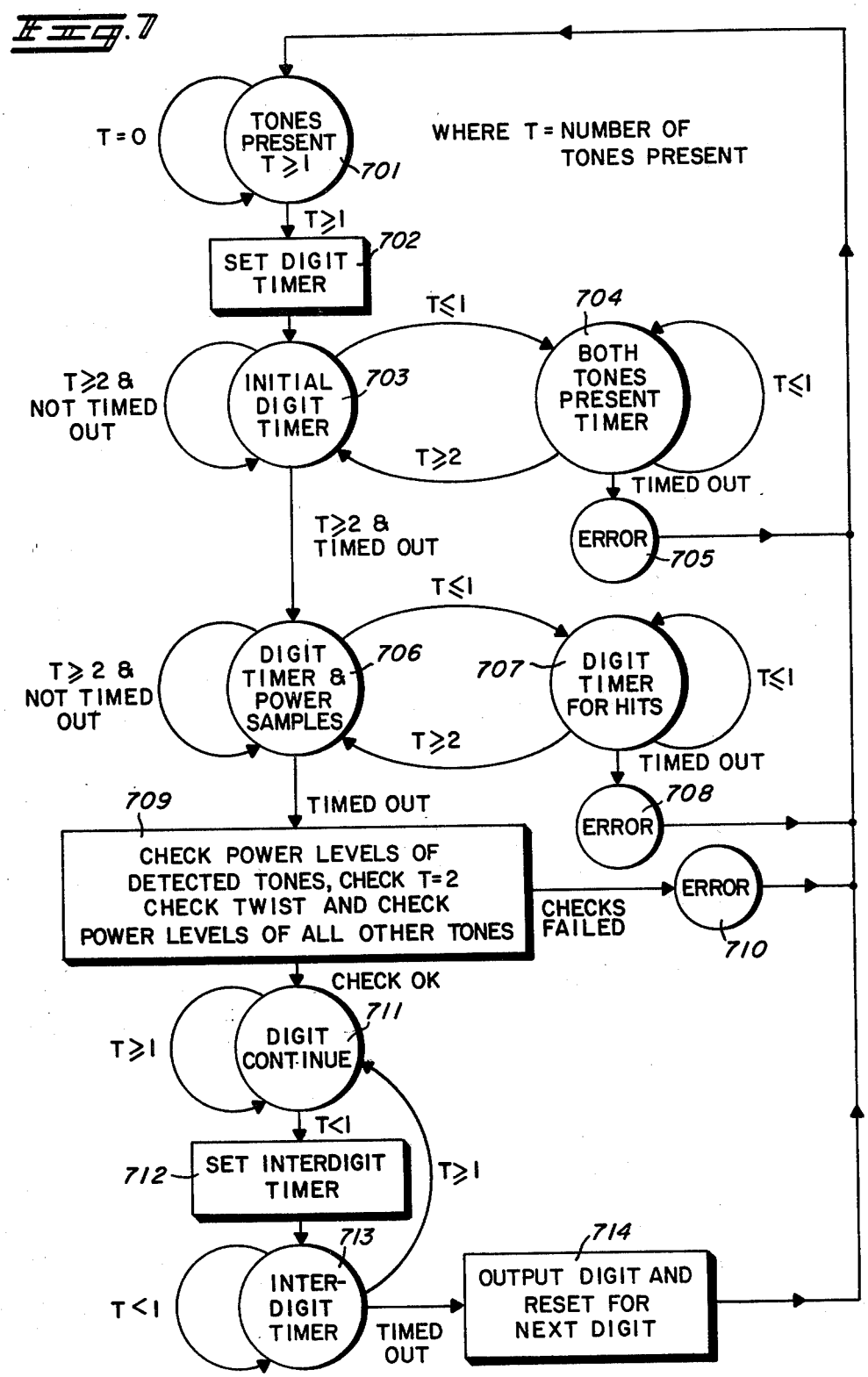

PROGRAMMABLE MULTIFREQUENCY TONE RECEIVER

BACKGROUND OF THE INVENTION

The present invention relates to tone receivers for communication systems, and more particularly, to multifrequency tone receivers for pulse-code-modulation (PCM) communication systems.

In prior art communication systems, tone receivers have typically been of the analog type since both speech signals and supervisory tone signals have been transmitted over communication channels in analog form. More recently, communication systems have adopted digital transmission techniques, such as PCM, because digital techniques provide very high quality signal transmission which is not degraded over long distances. Thus, since both speech signals and supervisory tone signals are digitally encoded in such communication systems, a digital tone receiver is preferable over a conventional analog tone receiver.

For detecting tones in a sampled digital signal, a digital tone receiver may utilize Fourier spectrum techniques, such as that described in the article entitled, "Digital MF Receiver Technique" by Jeffrey P. Mills, published in the GTE Automatic Electric Journal, Volume 15, No. 7, May 1977, at pages 317-325, or may utilize digital filter techniques, such as that described in the article entitled, "Special Purpose Hardware for Digital Filtering," by Stanley L. Freeny, published in the Proceedings of the IEEE, Vol 63, No. 4, April 1975, at pp. 633-648. The Fourier spectrum techniques described in the foregoing article require a large number of floating-point multiplication operations, which necessitate costly, high speed multipliers that have relatively high power dissipation ratings. Furthermore, the Fourier spectrum type tone receivers cannot readily provide filter operations having a number of cascaded filters which may be varied in both number and order under program control.

In the case of digital filter techniques, tone receivers utilizing digital filters are much slower than the Fourier spectrum type of tone receivers since a number of multiplication operations are required to implement each filter. For example, three multiplication operations are required for each second-order digital filter. Because multiplication operations are time consuming, tone receivers utilizing digital filters may only accommodate digital signals having relatively low sampling frequencies. Furthermore, such tone receivers would require a different digital filter therein to detect each different tone signal that may occur in a multifrequency tone signal. Thus, prior art tone receivers either require a large number of high speed multipliers as in the Fourier spectrum type of tone receiver, or require a large number of digital filters, each requiring a large number of relatively slow multiplication operations as in the digital filter type of tone receiver.

SUMMARY OF THE INVENTION

Accordingly, it is an object of the present invention to provide an improved programmable tone receiver that utilizes less circuitry than prior art tone receivers.

It is another object of the present invention to provide an improved programmable tone receiver that may be programmed to provide multiplexed filter operations of varying number and order for detecting a plurality of simultaneously occurring tone signals.

It is yet another object of the present invention to provide an improved programmable tone receiver that may be modularly expanded to accommodate a plurality of digital signals.

It is yet a further object of the present invention to provide an improved programmable tone receiver that includes an improved process for detecting the presence of multifrequency tone signals in a sampled digital signal.

It is yet a further object of the present invention to provide an improved programmable filter that is asynchronously controlled for optimizing the speed of performance.

It is yet a further object of the present invention to provide an improved programmable filter that provides a sequence of control signals for controlling filtering operations, and that further includes the capability of branching to a predetermined control signal in response to predetermined filter conditions.

In practicing the present invention, apparatus filters digitally coded signal samples for signal energy in one or more frequency passbands. The filtering apparatus includes a digital filter and a sequence controller for time multiplexing the digital filter so as to perform K cascaded M-order filtering operations, where K and M may be varied to provide a desired frequency passband. The digital filter operates asynchronously from the sequence controller, being enabled by a filter start signal from the sequence controller and indicating completion of the filtering operation by providing a filter done signal. The digital filter further provides an output signal which is an estimate of the signal energy in the particular frequency passband.

According to another feature of the present invention, the filtering apparatus may be adapted to operate as a multifrequency tone receiver by including a signal processor for processing the digital filter output signals. The signal processor indicates that a particular tone signal is present if the digital filter output signal has a magnitude greater than a predetermined magnitude. Thus, two or more simultaneously present tone signals may be detected by filtering the digitally coded signal sample for signal energy in the corresponding frequency passbands for each tone signal.

The tone receiver of the present invention is particularly well adapted for detecting the presence of multifrequency tone signals, such as those utilized for supervisory signalling in communication systems. Such multifrequency tone signals are various combinations of two simultaneous tone signals, which may be used to encode numerical information such as dialed digits of a telephone number. The digitally coded signal samples containing multifrequency tone signals may be provided from a corresponding analog signal by a sampling analog-to-digital converter, or may be any suitable digitally coded signal samples that are linearly digitized. Digitally coded signal samples that are linearly digitized may be applied directly to the tone receiver, whereas PCM samples companded according to U-law or A-law must be expanded into linearlly coded samples before application to the tone receiver.

BRIEF DESCRIPTION OF THE DRAWINGS

FIG. 1 is a general block diagram of the tone receiver embodying the present invention.

FIG. 2 is a block diagram of the cascaded filtering operation performed for each multifrequency tone signal.

FIG. 4 is a table describing the function of each bit of the instruction words stored in the microprogram ROM included in FIG. 3B.

FIG. 5 is a detailed block diagram of the filter timing logic included in FIG. 3B.

FIG. 6 illustrates waveforms of the signals provided by the filter timing logic of FIG. 5.

FIG. 7 is a flow chart utilized by the signal processing microcomputer included in FIG. 1 for processing the output signals received from the digital filter.

DETAILED DESCRIPTION OF THE PREFERRED EMBODIMENT

Figure 3B:
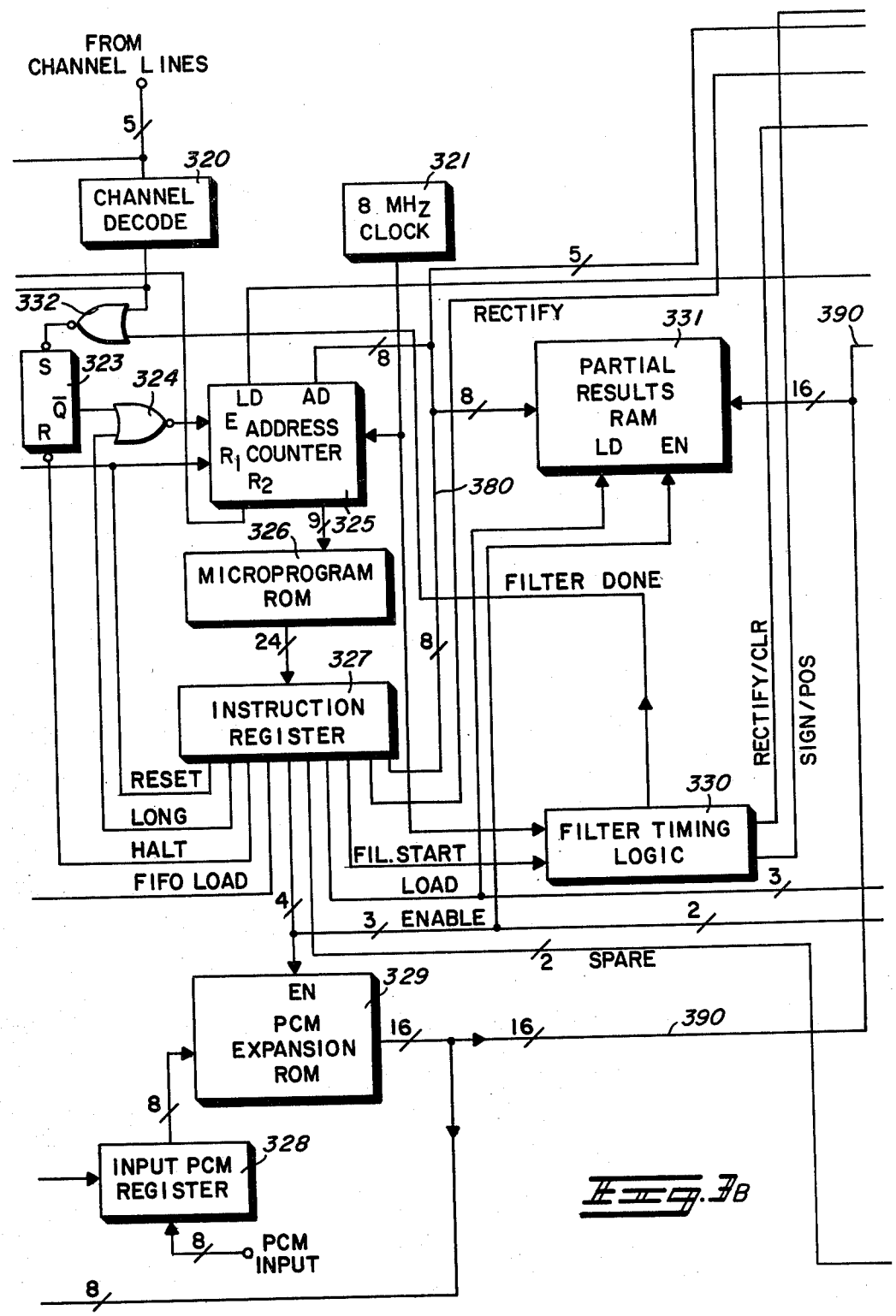
FIG. 3, including FIGS. 3A, 3B and 3C arranged as shown in FIG. 3D, is a detailed block diagram of the tone receiver of FIG. 1.

In FIG. 1, there is illustrated a system block diagram of a tone receiver 100 embodying the present invention. The tone receiver 100 includes a microprogrammed sequence controller 101, a time-multiplexed digital filter 102 and a (MF) signal processing microcomputer 103. In the preferred embodiment, the tone receiver 100 is programmed to receive multifrequency tone signalling in digitally coded signal samples. Multifrequency tone signalling may be utilized to transmit supervisory information in communication systems. For example, multifrequency tone signalling may utilize combinations of any two of six possible tones for encoding supervisory signalling. In telephone systems utilizing the so called North American MF tone signalling, combinations of any two of the six tones, 700 Hz, 900 Hz, 1100 Hz, 1300 Hz, 1500 Hz and 1700 Hz, have been utilized to encode dialing and supervisory information. The specifications for such MF signalling may be found in the Bell System publication, "Notes on Distance Dialing", at section 5, subsection 6. In other telephone systems, different numbers of tones and different frequency tones may be utilized for supervisory signalling, such as, for example, the so called MFC-R2 tone signalling which is described in detail in the CCITT Green Book, published by the Fifth Plenary Assembly, Vol. VI, REC. Q.365, 1973. To adapt the tone receiver of the present invention to receive a different type of tone signalling, one need only change the firmware of the tone receiver. Because of this unprecedented flexibility, the tone receiver embodying the present invention may be advantageously utilized in any application where a number of different frequency signals must be simultaneously detected.

In the preferred embodiment, the digitally coded signal samples are PCM samples in a PCM communication system. Such a PCM communication system is described in the instant assignee's copending application invented by Richard I. Little et al., entitled "Apparatus for a Radiotelephone Communication System", having Ser. No. 72,875, filed on Sept. 6, 1979 as a continuation-in-part application based upon now abandoned application, Ser. No. 876,956, filed on Feb. 13, 1978, also entitled "Apparatus for a Radiotelephone Communication System" and also invented by Richard L. Little et al. In these PCM communication systems, the PCM samples may be encoded according to either of two coding formats, commonly referred to as U-law and A-law. The coding and signalling specifications for such PCM communication systems are set forth in sections Q.46 and Q.47 of the aforementioned CCITT Green Book.

For each sample, the sequence controller 101 is programmed to provide a sequence of control signals for time-multiplexing digital filter 102 to perform K cascaded M-order filtering operations for each of the six MF tones, where K and M have been selected to be three and two, respectively. The particular values of K and M have been chosen to meet the specifications set forth by the Bell System for reliable detection of MF tones, although any value of K and M may be utilized in practicing the present invention. In addition, at the completion of the K cascaded filtering operations for each MF tone, the digital filter provides to the signal processing microcomputer 103 an eight-bit output signal that is an energy estimate of the power at the particular MF tone frequencies. The signal processing microcomputer 103 then analyzes the energy estimates for each of the MF tones to determine whether or not a particular MF tone is present.

An energy estimate taken over the entire MF signalling bandwidth is also required in order to eliminate falsing on strong spurious signals having a frequency outside of the MF signalling bandwidth, or on strong single tones having a frequency between that of two of the MF tones. For example, in the latter case, a strong single tone at 800 Hz may possibly produce enough energy in the 700 Hz MF filter and 900 Hz MF filter such that a 700 Hz/900 Hz MF tone would appear to be present. Thus, an additional filter operation is performed for providing a total energy estimate over the entire MF signalling bandwidth. When a strong single tone is present at 800 Hz, the total energy estimate will be greater than the energy estimate for the 700 Hz filter and the 900 Hz filter. Thus, falsing on a strong spurious signals and single tones may be eliminated simply by comparing the MF energy estimates with the total energy estimate, and rejecting the MF energy estimates if the total energy estimate is greater than at least one of the MF energy estimates.

In FIG. 2, there is illustrated a block diagram of the three cascaded second-order filtering operations that are performed for each MF tone. The first two filters are bandpass filters 201 and 202 that have a bandwidth of 10 Hz and that are stagger tuned in order to maintain a sharp roll off, while still providing sufficient bandwidth to maintain short tone recognition times. The last filter is a full-wave-rectifying low-pass filter 203, 204 for providing an output signal that is an estimate of the energy in the PCM signal at the respective MF tone frequency. Thus, for the six MF tones, eighteen second-order filtering operations are performed, and an additional full-wave-rectifying low pass filtering operation is performed to provide the total energy estimate.

Each of the second-order filters provide an output signal, Y(N), that may be characterized by the following equation:

$$Y(N) = A_1 X(N) + A_2 Y(N-1) + A_3 Y(N-2);$$

where $X(N)$ is the filter input signal, $Y(N-1)$ and $Y(N-2)$ are the previous two filter output signals, and $A_1$, $A_2$ and $A_3$ are filter coefficients.

This equation includes terms with recursive quantities $Y(N-1)$ and $Y(N-2)$, and does not include terms with nonrecursive quantities, $X(N-1)$ and $X(N-2)$, which are typically utilized in prior art second order filters. Thus, second order filters according to the foregoing equation have two poles and no zeros, whereas prior art second order filters have two poles and two zeros. By simplifying the foregoing equation, the number of coefficients for each filter has been reduced from five to three.

Implementing the foregoing equation according to prior art techniques would require three separate multiplication operations. However, by utilizing a digital filter architecture where successive bits of the signals X(N), Y(N−1) and Y(N−2), address a single coefficient, only one multiplication-like filtering operation need be performed to implement the foregoing equation. Thus, digital filter 102 of FIG. 1, under control of the sequence controller 101, essentially performs a single multiplication-like filtering operation to implement each of the filters of FIG. 2 for each MF tone. By architecturing the digital filter 102 in this manner, the time required for each filtering operation is greatly reduced, and, in addition, the digital filter 102 may be readily multiplexed under program control to implement the different filtering operations for each MF tone.

The detailed operation of the tone receiver of FIG. 1 may be more easily understood by reference to the detailed block diagram of FIG. 3, where FIG. 3A essentially shows the signal processing microcomputer 103 of FIG. 1, FIG. 3B essentially shows the microprogrammed sequence controller 101 of FIG. 1 and FIG. 3C essentially shows the time-multiplexed digital filter 102 of FIG. 1.

Referring to FIG. 3B, the sequence controller is essentially comprised of address counter 325, microprogram ROM 326 and instruction register 327. Instruction words providing a sequence of control signals are sequentially read from locations of the microprogram ROM 326 that are addressed by address counter 325. The read-out instruction words are loaded into instruction register 327. Each instruction word includes 24 bits, 16 of which are control signals and 8 of which are address signals, as illustrated by the instruction word format of FIG. 4. Of the 16 bits for control signals, 8 bits provide control signals for enabling devices to place data on, or receive data from, the 16-bit data bus 390, and 8 bits provide control signals for controlling the operation of the sequence controller and digital filter. The remaining 8 bits provide address signals 380 to the partial results RAM 331 and coefficient ROM 360. Since the partial results RAM 331 and coefficient ROM 360 are addressed by the same address signals 380, both of these memories are partitioned into areas that are associated with one another. For example, an area of the partial results RAM 331 may contain partial results for a particular filtering operation, and the commonly addressed area of the coefficient ROM 360 contains the coefficients for the same filtering operation.

The microprogram ROM 326 may be implemented with three 512×8 bit memories or with one 512×24 bit memory. The contents of the microprogram ROM 326 for the tone receiver of the present invention are shown in Table I. The 24-bit instruction words stored at each location of the microprogram ROM 326 are expressed in hexadecimal format. For example, instruction word 71DD06 is stored at location address 0000, and instruction word E1FD29 is stored at location address 003F.

TABLE I

MICROPROGRAM ROM

M. F. CODE-UPPER

| | | | | | | | | | | | | | | | | |
|---|---|---|---|---|---|---|---|---|---|---|---|---|---|---|---|---|
| 0000 | 71 | 79 | 70 | B1 | B1 | B5 | B1 | B3 | B1 | D1 | D0 | E1 | E0 | B1 | B1 | B5 |
| 0010 | B1 | B3 | B1 | D1 | D0 | E1 | E0 | B1 | B1 | B5 | B1 | B3 | B1 | D1 | D0 | E1 |
| 0020 | E0 | B1 | B1 | B5 | B1 | B3 | B1 | D1 | D0 | E1 | E0 | B1 | B1 | B5 | B1 | B3 |
| 0030 | B1 | D1 | D0 | E1 | E0 | B1 | B1 | B9 | B1 | B5 | B1 | B3 | B1 | D1 | D0 | E1 |
| 0040 | E0 | B1 | B1 | B9 | B1 | B5 | B1 | B3 | B1 | D1 | D0 | E1 | E0 | B1 | B1 | B9 |
| 0050 | B1 | B5 | B1 | B3 | B1 | D1 | D0 | E1 | E0 | B1 | B1 | B9 | B1 | B5 | B1 | B3 |
| 0060 | B1 | D1 | D0 | E1 | E0 | B1 | B1 | B9 | B1 | B5 | B1 | B3 | B1 | D1 | D0 | E1 |
| 0070 | E0 | B1 | B1 | B9 | B1 | B5 | B1 | B3 | B1 | D1 | D0 | E1 | E0 | B1 | B1 | B9 |
| 0080 | B1 | B5 | B1 | B3 | B1 | D1 | D0 | E1 | E0 | B1 | B1 | B9 | B1 | B5 | B1 | B3 |
| 0090 | B1 | D1 | D0 | E1 | E0 | B1 | B1 | B9 | B1 | B5 | B1 | B3 | B1 | D1 | D0 | E1 |
| 00A0 | E0 | B1 | B1 | B9 | B1 | B5 | B1 | B3 | B1 | D1 | D0 | E1 | E0 | B1 | B1 | B9 |
| 00B0 | B1 | B5 | B1 | B3 | B1 | D1 | D0 | E1 | E0 | B1 | B1 | B9 | B1 | B5 | B1 | B3 |
| 00C0 | B1 | D1 | D0 | E1 | E0 | 71 | 79 | B1 | B1 | B5 | B1 | B3 | B1 | D1 | D0 | E1 |
| 00D0 | E0 | B1 | B1 | B5 | B1 | B3 | B1 | D1 | D0 | E1 | E0 | B1 | B1 | B5 | B1 | B3 |
| 00E0 | B1 | D1 | D0 | E1 | E0 | B1 | B1 | B5 | B1 | B3 | B1 | D1 | D0 | E1 | E0 | B1 |
| 00F0 | B1 | B5 | B1 | B3 | B1 | D1 | D0 | E1 | E0 | B1 | B1 | B5 | B1 | B3 | B1 | D1 |
| 0100 | D0 | E1 | E0 | B1 | B1 | B9 | B1 | B5 | B1 | B3 | B1 | D1 | D0 | E1 | E0 | B1 |
| 0110 | B1 | B9 | B1 | B5 | B1 | B3 | B1 | D1 | D0 | E1 | E0 | B1 | B1 | B9 | B1 | B5 |
| 0120 | B1 | B3 | B1 | D1 | D0 | E1 | E0 | B1 | B1 | B9 | B1 | B5 | B1 | B3 | B1 | D1 |
| 0130 | D0 | E1 | E0 | B1 | B1 | B9 | B1 | B5 | B1 | B3 | B1 | D1 | D0 | E1 | E0 | B1 |
| 0140 | B1 | B9 | B1 | B5 | B1 | B3 | B1 | D1 | D0 | E1 | E0 | B1 | B1 | B9 | B1 | B5 |
| 0150 | B1 | B3 | B1 | D1 | D0 | E1 | E0 | B1 | B1 | B9 | B1 | B5 | B1 | B3 | B1 | D1 |
| 0160 | D0 | E1 | E0 | B1 | B1 | B9 | B1 | B5 | B1 | B3 | B1 | D1 | D0 | E1 | E0 | B1 |
| 0170 | B1 | B9 | B1 | B5 | B1 | B3 | B1 | D1 | D0 | E1 | E0 | B1 | B1 | B9 | B1 | B5 |
| 0180 | B1 | B3 | B1 | D1 | D0 | E1 | E0 | B1 | B1 | B9 | B1 | B5 | B1 | B3 | B1 | D1 |
| 0190 | D0 | E1 | E0 | B1 | B1 | B9 | B1 | B5 | B1 | B3 | B1 | D1 | D0 | E1 | E0 | 71 |
| 01A0 | B9 | B1 | B5 | B1 | B3 | B1 | D1 | D0 | E1 | E0 | B1 | B1 | B5 | B1 | B3 | B1 |
| 01B0 | D1 | D0 | E1 | E0 | E1 | FF | FF | FF | FF | FF | FF | FF | FF | FF | FF | FF |
| 01C0 | FF | FF | FF | FF | FF | FF | FF | FF | FF | FF | FF | FF | FF | FF | FF | FF |
| 01D0 | FF | FF | FF | FF | FF | FF | FF | FF | FF | FF | FF | FF | FF | FF | FF | FF |
| 01E0 | FF | FF | FF | FF | FF | FF | FF | FF | FF | FF | FF | FF | FF | FF | FF | FF |
| 01F0 | FF | FF | FF | FF | FF | FF | FF | FF | FF | FF | FF | FF | FF | FF | FF | FF |

M. F. CODE-LOWER

| | | | | | | | | | | | | | | | | |
|---|---|---|---|---|---|---|---|---|---|---|---|---|---|---|---|---|
| 0000 | DD | F9 | DC | FD | DD | FD | DD | 9D | DD | FC | D9 | FD | DD | FD | DD | FD |
| 0010 | DD | 9D | DD | FC | D9 | FD | DD | FD | DD | FD | DD | 9D | DD | FC | D9 | FD |
| 0020 | DD | FD | DD | FD | DD | 9D | DD | FC | D9 | FD | DD | FD | DD | FD | DD | 9D |
| 0030 | DD | FC | D9 | FD | DD | FD | DD | FD | DD | FD | DD | 9D | DD | FC | D9 | FD |

TABLE I-continued
MICROPROGRAM ROM

| | | | | | | | | | | | | | | | | |
|---|---|---|---|---|---|---|---|---|---|---|---|---|---|---|---|---|
| 0040 | DD | FD | DD | FD | DD | FD | DD | 9D | DD | FC | D9 | FD | DD | FD | DD | FD |
| 0050 | DD | FD | DD | 9D | DD | FC | D9 | FD | DD | FD | DD | FD | DD | FD | DD | 9D |
| 0060 | DD | FC | D9 | FD | DD | FD | DD | FD | DD | FD | DD | 9D | DD | FC | D9 | FD |
| 0070 | DD | FD | DD | FD | DD | FD | DD | 9D | DD | FC | D9 | FD | DD | FD | DD | FD |
| 0080 | DD | FD | DD | 9D | DD | FE | D9 | FD | DD | FD | DD | FD | DD | FD | DD | 9D |
| 0090 | DD | FE | C9 | FD | DD | FD | DD | FD | DD | FD | DD | 9D | DD | FE | C9 | FD |
| 00A0 | DD | FD | DD | FD | DD | FD | DD | 9D | DD | FE | C9 | FD | DD | FD | DD | FD |
| 00B0 | DD | FD | DD | 9D | DD | FE | C9 | FD | DD | FD | DD | FD | DD | FD | DD | 9D |
| 00C0 | DD | FE | C9 | FD | DD | D9 | FD | DD | FD | DD | 9D | DD | FC | C9 | FD |
| 00D0 | DD | FD | DD | FD | DD | 9D | DD | FC | D9 | FD | DD | FD | DD | FD | DD | 9D |
| 00E0 | DD | FC | D9 | FD | DD | FD | DD | FD | DD | 9D | DD | FC | D9 | FD | DD | FD |
| 00F0 | DD | FD | DD | 9D | DD | FC | D9 | FD | DD | FD | DD | FD | DD | 9D | DD | FC |
| 0100 | D9 | FD | DD | FD | DD | FD | DD | FD | DD | 9D | DD | FC | D9 | FD | DD | FD |
| 0110 | DD | FD | DD | FD | DD | 9D | DD | FC | D9 | FD | DD | FD | DD | FD | DD | FD |
| 0120 | DD | 9D | DD | FC | D9 | FD | DD | FD | DD | FD | DD | FD | DD | 9D | DD | FC |
| 0130 | D9 | FD | DD | FD | DD | FD | DD | FD | DD | 9D | DD | FC | D9 | FD | DD | FD |
| 0140 | DD | FD | DD | FD | DD | 9D | DD | FC | D9 | FD | DD | FD | DD | FD | DD | FD |
| 0150 | DD | 9D | DD | FE | D9 | FD | DD | FD | DD | FD | DD | FD | DD | 9D | DD | FE |
| 0160 | C9 | FD | DD | FD | DD | FD | DD | FD | DD | 9D | DD | FE | C9 | FD | DD | FD |
| 0170 | DD | FD | DD | FD | DD | 9D | DD | FE | C9 | FD | DD | FD | DD | FD | DD | FD |
| 0180 | DD | 9D | DD | FE | C9 | FD | DD | FD | DD | FD | DD | FD | DD | 9D | DD | FE |
| 0190 | C9 | FD | DD | FD | DD | FD | DD | FD | DD | 9D | DD | FE | C9 | FD | DD | DD |
| 01A0 | FD | DD | FD | DD | 9D | DD | FE | C9 | FD | DD | FD | DD | FD | DD | 9D | DD |
| 01B0 | FD | C9 | FD | DD | 1D | FF | FF | FF | FF | FF | FF | FF | FF | FF | FF | FF |
| 01C0 | FF | FF | FF | FF | FF | FF | FF | FF | FF | FF | FF | FF | FF | FF | FF | FF |
| 01D0 | FF | FF | FF | FF | FF | FF | FF | FF | FF | FF | FF | FF | FF | FF | FF | FF |
| 01E0 | FF | FF | FF | FF | FF | FF | FF | FF | FF | FF | FF | FF | FF | FF | FF | FF |
| 01F0 | FF | FF | FF | FF | FF | FF | FF | FF | FF | FF | FF | FF | FF | FF | FF | FF |

M. F. CODE-ADDRESS

| | | | | | | | | | | | | | | | | |
|---|---|---|---|---|---|---|---|---|---|---|---|---|---|---|---|---|
| 0000 | 06 | 06 | 06 | 08 | 08 | 09 | 09 | 09 | 09 | 00 | 00 | 01 | 01 | 10 | 10 | 11 |
| 0010 | 11 | 11 | 11 | 08 | 08 | 09 | 09 | 18 | 18 | 19 | 19 | 19 | 19 | 10 | 10 | 11 |
| 0020 | 11 | 20 | 20 | 21 | 21 | 21 | 21 | 18 | 18 | 19 | 19 | 28 | 28 | 29 | 29 | 29 |
| 0030 | 29 | 20 | 20 | 21 | 21 | 00 | 00 | 30 | 30 | 31 | 31 | 31 | 31 | 28 | 28 | 29 |
| 0040 | 29 | 08 | 08 | 38 | 38 | 39 | 39 | 39 | 39 | 30 | 30 | 31 | 31 | 10 | 10 | 40 |
| 0050 | 40 | 41 | 41 | 41 | 41 | 38 | 38 | 39 | 39 | 18 | 18 | 48 | 48 | 49 | 49 | 49 |
| 0060 | 49 | 40 | 40 | 41 | 41 | 20 | 20 | 50 | 50 | 51 | 51 | 51 | 51 | 48 | 48 | 49 |
| 0070 | 49 | 28 | 28 | 58 | 58 | 59 | 59 | 59 | 59 | 50 | 50 | 51 | 51 | 30 | 30 | 60 |
| 0080 | 60 | 61 | 61 | 61 | 61 | 58 | 58 | 59 | 59 | 38 | 38 | 62 | 62 | 63 | 63 | 63 |
| 0090 | 63 | 60 | 60 | 61 | 61 | 40 | 40 | 68 | 68 | 69 | 69 | 69 | 69 | 62 | 62 | 63 |
| 00A0 | 63 | 48 | 48 | 6A | 6A | 6B | 6B | 6B | 6B | 68 | 68 | 69 | 69 | 50 | 50 | 70 |
| 00B0 | 70 | 71 | 71 | 71 | 71 | 6A | 6A | 6B | 6B | 58 | 58 | 72 | 72 | 73 | 73 | 73 |
| 00C0 | 73 | 70 | 70 | 71 | 71 | 71 | 71 | 80 | 80 | 81 | 81 | 81 | 81 | 72 | 72 | 73 |
| 00D0 | 73 | 88 | 88 | 89 | 89 | 89 | 89 | 80 | 80 | 81 | 81 | 90 | 90 | 91 | 91 | 91 |
| 00E0 | 91 | 88 | 88 | 89 | 89 | 98 | 98 | 99 | 99 | 99 | 99 | 90 | 90 | 91 | 91 | A0 |
| 00F0 | A0 | A1 | A1 | A1 | A1 | 98 | 98 | 99 | 99 | A8 | A8 | A9 | A9 | A9 | A9 | A0 |
| 0100 | A0 | A1 | A1 | 80 | 80 | B0 | B0 | B1 | B1 | B1 | B1 | A8 | A8 | A9 | A9 | 88 |
| 0110 | 88 | B8 | B8 | B9 | B9 | B9 | B0 | B0 | B1 | B1 | 90 | 90 | C0 | C0 | C1 |
| 0120 | C1 | C1 | C1 | B8 | B8 | B9 | B9 | 98 | 98 | C8 | C8 | C9 | C9 | C9 | C9 | C0 |
| 0130 | C0 | C1 | C1 | A0 | A0 | D0 | D0 | D1 | D1 | D1 | D1 | C8 | C8 | C9 | C9 | A8 |
| 0140 | A8 | D8 | D8 | D9 | D9 | D9 | D9 | D0 | D0 | D1 | D1 | B0 | B0 | E0 | E0 | E1 |
| 0150 | E1 | E1 | E1 | D8 | D8 | D9 | D9 | B8 | B8 | E2 | E2 | E3 | E3 | E3 | E3 | E0 |
| 0160 | F0 | F1 | F1 | C0 | C0 | E8 | E8 | E9 | E9 | E9 | E9 | E2 | E2 | E3 | E3 | C8 |
| 0170 | C8 | EA | EA | EB | EB | EB | E8 | E8 | E9 | E9 | D0 | D0 | F0 | F0 | F1 |
| 0180 | F1 | F1 | F1 | EA | EA | EB | EB | D8 | D8 | F2 | F2 | F3 | F3 | F3 | F3 | F0 |
| 0190 | F0 | F1 | F1 | 06 | 06 | 78 | 79 | 79 | 79 | 79 | F2 | F2 | F3 | F3 | F3 |
| 01A0 | F8 | F8 | F9 | F9 | F9 | 78 | 78 | 79 | 79 | 00 | 00 | 01 | 01 | 01 | 01 |
| 01B0 | F8 | F8 | F9 | F9 | F9 | FF | FF | FF | FF | FF | FF | FF | FF | FF | FF | FF |
| 01C0 | FF | FF | FF | FF | FF | FF | FF | FF | FF | FF | FF | FF | FF | FF | FF | FF |
| 01D0 | FF | FF | FF | FF | FF | FF | FF | FF | FF | FF | FF | FF | FF | FF | FF | FF |
| 01E0 | FF | FF | FF | FF | FF | FF | FF | FF | FF | FF | FF | FF | FF | FF | FF | FF |
| 01F0 | FF | FF | FF | FF | FF | FF | FF | FF | FF | FF | FF | FF | FF | FF | FF | FF |

If the microprogram ROM 326 is located with the data shown in Table I, the tone receiver of FIG. 3 will perform, for each PCM sample, three cascaded filtering operations for each of the six MF tones and additionally perform a low-pass filtering operation for the total energy estimate. However, any desired filtering operations can readily be programmed by using the mnemonics shown in Table II. For example, the three cascaded filters of FIG. 2 may be implemented as shown in Table III. Once a mnemonic program, as shown in Table III, has been developed, the mnemonics of each step may be formed into 24-bit instruction words by properly coding the logical state of each bit in accordance with the instruction word format in FIG. 4.

After completing the filtering operations for all six MF tones, the tone receiver is idle until another PCM sample is received from a preselected PCM channel. In the idle state, flip-flop 323 is reset and disables address counter 325 via NOR gate 324. In addition, address counter 325 is initially at state zero. The preselected PCM channel is decoded from five channel address lines by decoding circuitry 320. When the channel address is decoded from the channel address lines, the decoding circuit 320 provides an output pulse. The output pulse from the channel decode circuitry 320, via NOR gate 322, sets flip-flop 323 to enable address counter 325, resets FIFO 307 via NOR gate 308 and strobes an eight bit PCM sample from the preselected PCM channel into the input PCM register 328.

Once the address counter 325 is enabled, the address counter 325 provides sequential address signals for sequentialy reading out the instruction words stored in the microprogram ROM 326. The instruction words are read out and loaded into the instruction register 327 by the 8 MHz clock signal provided by block 321. The sequence of control signals provided by the read-out instruction words are essentially similar for implementing each filter.

TABLE II
Microprogram Mnemonics

| Mnemonic | Description |
|---|---|
| PCMX | Bus Source = PCM Register |
| YNE | Bus Source = Y(N) Register |
| YN1E | Bus Source = Y(N−1) Register |
| RAM | Bus Source = RAM |
| XNLOAD | Bus Destination = X(N) Register |
| YN1LOAD | Bus Destination = Y(N−1) Register |
| YN2LOAD | Bus Destination = Y(N−2) Register |
| RAMLOAD | Bus Destination = RAM |
| RESET | Microprogram Control - Reset Address Counter |
| HALT | Microprogram Control - Halt Sequencer |
| LONG | Microprogram Control - Hold Next Instruction For 2 Clock Cycles |
| FIFOLOAD | Microprogram Control - Load Output Into FIFO |
| RECTIFY | Filter control - Take Absolute Value of X(N) |
| FILSTART | Filter control - Start Filter |
| NOP | No operation |
| FILTER1 | RAM Address For Filter #1 |
| FILTER2 | RAM Address For Filter #2 |
| FILTER3 | RAM Address For Filter #3 |
| XNFET | X(N) Address |
| YN1FET | Y(N−1) Address |
| YN2FET | Y(N−2) Address |

TABLE III
Sample Microprogram For a Three-Stage Tuned Filter Network

| Mnemonics | Comments |
|---|---|
| PCMX; | PUT PCM INPUT REGISTER ON THE FILTER BUS |
| XNLOAD; | LOAD X(N) |
| FILSTART, RAM, XNFET, FILTER2, LONG; | START FILTER #1, PUT RAM ON BUS, FETCH X(N) FOR FILTER #2 |
| NOP; | |
| XNLOAD, YN1FET, LONG; | LOAD X(N), FETCH Y(N−1) |
| NOP; | |
| YN1LOAD, YN2FET, LONG; | LOAD Y(N−1), FETCH Y(N−2) |
| NOP; | |
| YN2LOAD, HALT; | LOAD Y(N−2), WAIT FOR FILTER #1 DONE |
| NOP; | |
| FILSTART, YNE, FILTER1, LONG; | START FILTER #2, PUT Y(N) OUTPUT REGISTER ON BUS |
| RAMLOAD; | STORE Y(N) RESULT IN RAM |
| YN1E, LONG; | PUT Y(N−1) REGISTER ON BUS |
| RAMLOAD; | STORE Y(N−2) RESULT IN RAM |
| RAM, XNFET, FILTER3, LONG; | FETCH X(N) FOR LOW-PASS |
| NOP; | |
| XNLOAD, YN1FET, LONG; | LOAD X(N), FETCH Y(N−1) |
| NOP; | |
| YN1LOAD, YN2FET, LONG; | LOAD Y(N−1), FETCH Y(N−2) |
| NOP; | |
| YN2LOAD, HALT; | LOAD Y(N−2), WAIT FOR FILTER #2 DONE |
| NOP; | |
| FILSTART, YNE, RECTIFY FILTER2, LONG | START FILTER #3 PUT Y(N) OUTPUT REGISTER ON BUS |
| RAMLOAD: | STORE Y(N) RESULT IN RAM |
| YN1E, LONG: | PUT Y(N−1) REGISTER ON BUS |
| RAMLOAD; | STORE Y(N−1) RESULT IN RAM |
| RAM, YN1FET, FILTER1, LONG | PUT RAM ON BUS, FETCH Y(N−1) FOR FILTER #1 |
| NOP; | |
| YN1LOAD, YN2FET, LONG; | LOAD Y(N−1), FETCH Y(N−2) |
| NOP; | |
| YN2LOAD, HALT; | LOAD Y(N−2), WAIT FOR FILTER #3 DONE |
| NOP; | |
| YNE, FILTER3, LONG; | PUT Y(N) OUTPUT REGISTER ON BUS |
| RAMLOAD; | STORE Y(N) RESULT IN RAM |
| FIFOLOAD | STORE Y(N) RESULT IN FIFO |
| YN1E, LONG; | PUT Y(N−1) REGISTER ON BUS |
| RAMLOAD | STORE Y(N−1) RESULT IN RAM |
| HALT, RESET; | RESET TO BEGINNING OF PROGRAM FOR NEXT PCM SAMPLE |

According to the present invention, the following sequence of control signals is provided for each cascaded filtering operation. Prior to enabling the digital filter with the FILTER START signal, the X(N) register 351, Y(N−1) register 356 and Y(N−2) register 354 are loaded from the partial results RAM 331. However, for the first of the three cascaded filters, the X(N) register 351 is loaded with the expanded PCM sample from the PCM expansion ROM 329, while for succeeding filters the X(N) register 351 is loaded with the output signal from the previous filtering operation from the partial results RAM 331. Once the registers 351, 356 and 354 are loaded with the appropriate input signals, a FILTER START signal is applied to the filter timing logic 330 for enabling the digital filter. The filter timing logic 330 first causes the signals from the registers, X(N) 351, Y(N−1) 356 and Y(N−2) 354, to be loaded into shift registers 352, 357 and 355, respectively. Next, the filter timing logic 330 enables the digital filter to perform a filtering operation with coefficients addressed from the coefficient ROM 360 by the tone address signals 380 and bits serially received from shift registers 352, 357 and 355. For lowpass filters, a RECTIFY signal is provided which, via NAND gate 349, sets flip-flop 350 to provide a logical high state at the Q output thereof, if the signal in the X(N) register 351 is negative. When the Q output of flip-flop 350 has a logical high state, the bits shifted from shift register are logically complemented by exclusive OR gate 353. This operation provides for full-wave rectification by one's complementing negative signals in the X(N) register 351. Although this operation should ideally provide for two's complementing, the error introduced by one's complementing is so small that it is essentially negligible. For succeeding filters, flip-flop 350 is reset by the RECTIFY/CLR signal. When the filtering operation is complete, the FILTER DONE signal is provided by the filter timing logic 330, and the digital filter output signal and previous digital filter output signal are provided in Y(N) register 370 and Y(N−1) register 358, respectively.

According to another feature of the present invention, while the digital filter is performing the filtering operation, the sequence controller is loading the X(N) register 351, Y(N−1) register 356 and Y(N−2) register 354 with the signals for the next filter. When the sequence controller completes the loading of the registers 351, 356, and 354, a HALT signal is provided to disable the address counter and wait for the FILTER DONE signal. The foregoing basic sequence of events is essentially repeated for performing each filtering operation.

According to yet another feature of the present invention, the sequence of control signals provided by the sequence controller may be modified in response to predetermined conditions by providing branching capability. Branching may be implemented by changing the state of the address counter 325 in response to conditions, such as a negative or overflow condition for the accumulator output signal. In order to implement branching, a branching instruction word may be provided using the spare bits of the instruction word (see FIG. 4) to enable gates 396 and 397. Gate 396 is enabled on a negative condition, and gate 397 an overflow condition, for the accumulator output signal. Thus, if the condition is satisfied, a logic high state is provided by the gate 395 which causes address counter 325 to be loaded with the address signals 380 from the instruction word. As a result, the sequence of control signals is modified to branch to the control signal stored in the microprogram ROM 326 at the location addressed by the address signals from the branching instruction word. The inventive branching capability of the sequence controller further enhances the flexibility of control over the operation of the digital filter.

The filter timing logic 330 of FIG. 3 is illustrated in more detail in the block diagram of FIG. 5. Referring to FIG. 5, the filter timing logic consists essentially of five flip-flops 501–506, a divide-by-sixteen counter 507 and flip-flop 508, and gating circuitry 510–516 for providing digital filter control signals. By utilizing the filter timing logic of FIG. 5, the digital filter of the present invention may operate asynchronously from the sequence controller. Once enabled by the FILTER START signal, the filter timing logic enables the digital filter to perform a filtering operation implementing a selected MF tone filter. When the filtering operation is completed, the filter timing logic provides the FILTER DONE signal. Thus, according to an important feature of the present invention, the digital filter may be run at the highest practically allowable speed by the filter timing logic without being slowed down by the sequence controller.

The operation of the filter timing logic of FIG. 5 is initiated by receipt of the FILTER START signal which sets the Q output of flip-flop 501 to a logical high state. The logical high state from the Q output of flip-flop 501 is transferred to flip-flops 502–506 on succeeding 8 MHz clock pulses. The counter 507 is enabled when the Q output of flip-flop 502 changes to a logical high. After sixteen pulses of the 8 MHz clock signal, counter 507 provides a reset pulse for resetting flip-flop 501. Waveforms of the labelled signals of FIG. 5 are shown in FIG. 6.

Once the filter timing logic is enabled by the FILTER START signal, the digital filter essentially performs a 16-bit multiplication-like filtering operation utilizing the signals loaded into the shift registers 352, 355 and 357. Each signal in the shift registers 352, 355 and 357 is represented as a 16-bit fixed point fraction having a sign bit and 15 data bits. The 15 data bits provide an overall 90 db range for accommodating a dynamic range of 30 db for the PCM signal, a gain of 36 db in the digital filter and a dynamic range of 24 db for MF tone signals.

A typical digital filtering operation may be described in detail with reference to FIG. 3 and the waveforms of FIG. 6. First, each of the shift registers 352, 355 and 357 is loaded from corresponding registers 351, 354 and 356 when the REG/LOAD & SHIFT signal 603 is in the logical low state. Next, bits are serially shifted from the shift registers 352, 355 and 357 into the pipeline register 359 when the REG/LOAD & SHIFT signal 603 has a logical high state. The REG/LOAD & SHIFT signal 603 provides for sixteen shifts of the registers 352, 355 and 357, such that register 357 is entirely recirculated. Registers 352 and 355 may also be recirculated, if desired. Pipeline register 359 is also loaded with five bits of the tone address signals 380 from the instruction word in instruction register 327. The tone address signals 380 from the instruction word select the portion of the coefficient ROM 360 containing the coefficient signals for the particular filtering operation to be executed. Thus, the coefficients for the particular filtering operation are read from the coefficient ROM 360, in accordance with the tone address signals 380 and the three bits serially received from the shift registers 352, 355 and 357.

Next, the read-out coefficients are loaded via twelve exclusive OR gates 361 (illustrated as one gate for clarity) into pipeline register 362. The read-out coefficients are logically complemented for the sign bit position by the exclusive OR gates 361 under control of the SIGN-/POS signal 609 from the filter timing logic 330. The sign bit is logically complemented, since, if present, the sign bit is indicative of a negative number and has a negative weighting factor. The exclusive OR gates 361 provide a one's complement representation of the read-out coefficient when enabled. Ideally, a two's complement representation of the read-out coefficient should be provided. This problem is rectified by providing a carry bit via the ADD/ONE signal to adder 363 for adding a low order bit to the one's complement representation of the read-out coefficient for the sign bit position. Adding a low order bit to the one's complement representation results in the desired two's complement representation.

The contents of the coefficient ROM 360 for the MF tone receiver of the present invention are shown in Table IV. Each coefficient has 12 bits, including a sign bit and 11 data bits. Each coefficient is a fixed point fraction which can take values between −2 and +2. Empirical testing has demonstrated that 11 data bits were adequate for proper operation of the MF tone receiver of the present invention. Referring to Table IV, the coefficients stored at each location address of the coefficient ROM 360 are expressed in hexadecimal format. For example, coefficient 000 is stored at location address 0000, and coefficient 05E is stored at location address 009E.

Returning to the operation of the digital filter, each coefficient read out of the coefficient ROM 360 and loaded into the pipeline register 362 is next summed in an accumulator including 12-bit adder 363 and 20-bit register 364. The adder 363 sums the read-out coefficient from pipeline register 362 with the accumulator output signal from register 364 shifted right by one bit. The right shifting of the accumulator output signal before addition with the coefficient is necessary to provide a multiplication-like operation. The accumulator performs sixteen accumulating operations, one for each of the coefficients read out of the coefficient ROM 360. Thus, in order to hold the results of the sixteen accumulating operations, register 364 would ideally be a 32-bit register. However, provision of only 20 bits in register 364 does not result in any appreciable degradation in the accumulator output signal. During the last accumulating operation, a low order bit is applied to the carry input of the adder 363 by the ADD/ONE signal 606 of FIG. 6.

TABLE IV

FILTER COEFFICIENT ROM

M. F. COEFFICIENT-1

| | | | | | | | | | | | | | | | | |
|---|---|---|---|---|---|---|---|---|---|---|---|---|---|---|---|---|
| 0000 | 0 | 0 | 6 | 6 | C | C | 2 | 3 | 0 | 0 | 5 | 6 | C | C | 2 | 2 |
| 0010 | 0 | 0 | 5 | 5 | C | C | 1 | 1 | 0 | 0 | 4 | 4 | C | C | 0 | 0 |
| 0020 | 0 | 0 | 3 | 3 | C | C | F | F | 0 | 0 | 1 | 2 | C | C | E | E |
| 0030 | 0 | 0 | 6 | 6 | C | C | 2 | 3 | 0 | 0 | 5 | 6 | C | C | 2 | 2 |
| 0040 | 0 | 0 | 4 | 5 | C | C | 1 | 1 | 0 | 0 | 3 | 4 | C | C | 0 | 0 |
| 0050 | 0 | 0 | 2 | 3 | C | C | F | F | 0 | 0 | 1 | 2 | C | C | D | E |
| 0060 | 0 | 0 | 7 | 7 | C | C | 3 | 4 | 0 | 0 | 7 | 7 | C | C | 3 | 4 |
| 0070 | 0 | 0 | 7 | 7 | C | C | 3 | 4 | 0 | 0 | 7 | 7 | C | C | 3 | 4 |
| 0080 | 0 | 0 | 6 | 6 | C | C | 2 | 3 | 0 | 0 | 5 | 6 | C | C | 2 | 2 |
| 0090 | 0 | 0 | 5 | 5 | C | C | 1 | 1 | 0 | 0 | 4 | 4 | C | C | 0 | 0 |
| 00A0 | 0 | 0 | 3 | 3 | C | C | F | F | 0 | 0 | 1 | 2 | C | C | E | E |
| 00B0 | 0 | 0 | 6 | 6 | C | C | 2 | 3 | 0 | 0 | 5 | 6 | C | C | 2 | 2 |
| 00C0 | 0 | 0 | 4 | 5 | C | C | 1 | 1 | 0 | 0 | 3 | 4 | C | C | 0 | 0 |
| 00D0 | 0 | 0 | 2 | 3 | C | C | F | F | 0 | 0 | 1 | 2 | C | C | D | E |
| 00E0 | 0 | 0 | 7 | 7 | C | C | 3 | 4 | 0 | 0 | 7 | 7 | C | C | 3 | 4 |
| 00F0 | 0 | 0 | 7 | 7 | C | C | 3 | 4 | 0 | 0 | 7 | 7 | C | C | 3 | 4 |

M. F. COEFFICIENT-2

| | | | | | | | | | | | | | | | | |
|---|---|---|---|---|---|---|---|---|---|---|---|---|---|---|---|---|
| 0000 | 0 | 3 | A | D | 3 | 6 | E | 1 | 0 | 3 | F | 3 | 3 | 7 | 3 | 7 |
| 0010 | 0 | 4 | 1 | 6 | 3 | 8 | 5 | A | 0 | 5 | 2 | 7 | 3 | 8 | 5 | B |
| 0020 | 0 | 5 | 0 | 6 | 3 | 9 | 4 | A | 0 | 5 | E | 4 | 3 | 9 | 2 | 8 |
| 0030 | 0 | 3 | 9 | C | 3 | 7 | C | 0 | 0 | 3 | D | 1 | 3 | 7 | 1 | 5 |
| 0040 | 0 | 4 | F | 4 | 3 | 8 | 3 | 7 | 0 | 5 | F | 4 | 3 | 8 | 3 | 8 |
| 0050 | 0 | 5 | E | 3 | 3 | 9 | 1 | 7 | 0 | 5 | B | 1 | 3 | 9 | F | 5 |
| 0060 | 0 | 0 | 8 | 8 | 7 | 7 | F | 0 | 0 | 0 | 8 | 8 | 7 | 7 | F | 0 |
| 0070 | 0 | 0 | 8 | 8 | 7 | 7 | F | 0 | 0 | 0 | 8 | 9 | 7 | 8 | F | 0 |
| 0080 | 0 | 3 | A | D | 3 | 6 | E | 1 | 0 | 3 | F | 3 | 3 | 7 | 3 | 7 |
| 0090 | 0 | 4 | 1 | 6 | 3 | 8 | 5 | A | 0 | 5 | 2 | 7 | 3 | 8 | 5 | B |
| 00A0 | 0 | 5 | 0 | 6 | 3 | 9 | 4 | A | 0 | 5 | E | 4 | 3 | 9 | 2 | 8 |
| 00B0 | 0 | 3 | 9 | C | 3 | 7 | C | 0 | 0 | 3 | D | 1 | 3 | 7 | 1 | 5 |
| 00C0 | 0 | 4 | F | 4 | 3 | 8 | 3 | 7 | 0 | 5 | F | 4 | 3 | 8 | 3 | 8 |
| 00D0 | 0 | 5 | E | 3 | 3 | 9 | 1 | 7 | 0 | 5 | B | 1 | 3 | 9 | F | 5 |
| 00E0 | 0 | 0 | 8 | 8 | 7 | 7 | F | 0 | 0 | 0 | 8 | 8 | 7 | 7 | F | 0 |
| 00F0 | 0 | 0 | 8 | 8 | 7 | 7 | F | 0 | 0 | 0 | 8 | 9 | 7 | 8 | F | 0 |

M.F. COEFFICIENT-3

| | | | | | | | | | | | | | | | | |
|---|---|---|---|---|---|---|---|---|---|---|---|---|---|---|---|---|
| 0000 | 0 | 1 | A | B | D | E | 6 | 8 | 0 | D | 6 | 3 | D | A | 2 | 0 |
| 0010 | 0 | 8 | C | 4 | D | 5 | 8 | 1 | 0 | 1 | 2 | 3 | D | E | E | 0 |
| 0020 | 0 | 8 | E | 6 | D | 5 | A | 2 | 0 | D | 6 | 3 | D | A | 3 | 0 |
| 0030 | 0 | 3 | 1 | 5 | D | 0 | E | 1 | 0 | F | 7 | 6 | D | C | 4 | 3 |
| 0040 | 0 | A | 8 | 2 | D | 6 | 5 | E | 0 | 2 | A | C | D | F | 6 | 9 |
| 0050 | 0 | 9 | 3 | C | D | 6 | F | 8 | 0 | E | 9 | 6 | D | A | 5 | 3 |
| 0060 | 0 | 7 | 5 | C | 7 | F | C | 4 | 0 | 7 | 5 | C | 7 | F | C | 4 |
| 0070 | 0 | 7 | 5 | C | 7 | F | C | 4 | 0 | A | 5 | 0 | 7 | 2 | C | 7 |
| 0080 | 0 | 1 | A | B | D | E | 6 | 8 | 0 | D | 6 | 3 | D | A | 2 | 0 |
| 0090 | 0 | 8 | C | 4 | D | 5 | 8 | 1 | 0 | 1 | 2 | 3 | D | E | E | 0 |

TABLE IV-continued

| FILTER COEFFICIENT ROM | | | | | | | | | | | | | | | |
|---|---|---|---|---|---|---|---|---|---|---|---|---|---|---|---|
| 00A0 | 0 | 8 | E | 6 | D | 5 | A | 2 | 0 | D | 6 | 3 | D | A | 3 | 0 |
| 00B0 | 0 | 3 | 1 | 5 | D | 0 | E | 1 | 0 | F | 7 | 6 | D | C | 4 | 3 |
| 00C0 | 0 | A | 8 | 2 | D | 6 | 5 | E | 0 | 2 | A | C | D | F | 6 | 9 |
| 00D0 | 0 | 9 | 3 | C | D | 6 | F | 8 | 0 | E | 9 | 6 | D | A | 5 | 3 |
| 00E0 | 0 | 7 | 5 | C | 7 | F | C | 4 | 0 | 7 | 5 | C | 7 | F | C | 4 |
| 00F0 | 0 | 7 | 5 | C | 7 | F | C | 4 | 0 | A | 5 | 0 | 7 | 2 | C | 7 |

This operation converts the one's complement representation of the read-out coefficient for the sign bit position to a two's complement representation, as explained hereinabove. The ADD/ONE signal 606 may also be utilized to provide for rounding of the accumulator signal by providing a carry bit during one or more of the accumulating operations prior to the last accumulating operation. Rounding of the accumulator signal is beneficial in that it improves performance by reducing limit cycles on the digital filter output signal.

Large scale limit cycles may also result, if the accumulator signal is allowed to overflow. Therefore, overflow detection circuitry 365–369 is provided to clamp the accumulator signal at a predetermined maximum positive number or a predetermined minimum negative number when an overflow occurs. A positive or negative overflow is detected by exclusive OR gates 365 and 366 by examining the three high order bits of the accumulator signal. If the three high order bits do not have the same logical state, the select input of multiplexer 369 is enabled to select its A inputs instead of its B inputs. If the A inputs of multiplexer 369 are selected, a sign bit, A, of the accumulator signal is provided as the sign bit to the Y(N) register 370 and the remaining 15 data bits are provided via inverting gate 368 as the logical complement of the sign bit A. Thus, the 16-bit output signal provided by multiplexer 369 is forced to the largest positive 16-bit signal if the sign bit is a logical zero indicating a positive accumulator signal, or the smallest negative 16-bit signal if the sign bit is a logical one indicating a negative accumulator signal. Otherwise, multiplexer 369 selects the B inputs, which provides 16 bits of the 20 bit accumulator signal, having truncated the second and third high order bits and the lowest order bit from the accumulator signal.

After the last adding operation performed by the accumulator, the Y(N) register 370 is loaded with the 16-bit accumulator signal from multiplexer 369 in response to the FILTER DONE signal 613 of FIG. 6. The FILTER DONE signal 613 is also coupled via NOR gate 322 to the set input of flip-flop 323 for re-enabling the address counter 325.

Next, the sequence controller stores the digital filter result from the Y(N) register 370 and the previous digital filter result from the Y(N−1) register 358 in the partial results RAM 331. According to yet another feature of the present invention, before storing the digital filter output signal and previous digital filter output signal, the sequence controller can enable the digital filter to perform the next filtering operation, provided the X(N) register 351, Y(N−1) register 356 and Y(N−2) register 354 have been loaded with the proper signals during the previous digital filter operation. If the last completed digital filtering operation was the last operation for a set of cascaded filters, the sequence controller provides a FIFO LOAD signal for also loading the digital filter output signal from the Y(N) register 370 into the FIFO memory 307. Once the filtering operations for all six MF tones have been completed by the sequence controller, a HALT signal and a RESET signal may be provided to reset address counter 325 to its initial state and to set flip-flop 310 via gates 311 and 312, for providing a FIFO DATA VALID signal to indicate to the signal processing microcomputer of FIG. 3A that FIFO memory 307 has been loaded with a complete set of filter results. However, the FIFO DATA VALID signal may only be enabled provided that the signal processing microcomputer has requested new data by enabling NAND gate 311 with a FIFO DATA REQUEST signal from PIA 306. Thus, when the FIFO DATA VALID signal changes to a logical high state, the FIFO memory 307 has just been loaded with six energy estimates for each of the MF tones and one total energy estimate. The signal processing microcomputer may now process the seven energy estimates stored in the FIFO memory 307, which were developed from a PCM sample. Thus, the FIFO memory 307 is a key element linking the high speed sequence controller and digital filter to the slower signal processing microcomputer.

The signal processing microcomputer of FIG. 3A includes a microprocessor (MPU) 303, such as the Motorola M6800 (see U.S. Pat. No. 4,030,079 and related patents cited therein); read only memory (ROM) 302, such as the Motorola M6830, for storing a control program; peripheral interface adaptor (PIA) 306, such as the Motorola M6821 (see U.S. Pat. No. 3,979,730); a watchdog timer 301 for detecting a malfunction of the tone recognition microcomputer and resetting the microprocessor 303; an output register 305 for interfacing the tone recognition microcomputer to other computers or microcomputers; a FIFO memory 307 for storing the digital filter energy estimates; and address decoding logic 304 coupled to the address lines from the microprocessor 303 for decoding pre-established addresses for enabling the watchdog timer 301, the ROM 302, the output register 305, the FIFO memory 307 and the PIA 306. Each of the blocks of the signal processing microcomputer of FIG. 3A can be realized with conventional logic devices, such as those provided for the M6800 microcomputer system, and are arranged and connected in a conventional manner. For example, the watchdog timer 301 may be provided by any monostable device, such as the Motorola MC6840 programmable timer, and is periodically reset by the microprocessor 303. If not periodically reset, the watchdog timer 301 times out and provides a RESET signal for resetting the microprocessor 303 to a predetermined restart address and also resetting address counter 325 of the sequence controller of FIG. 3B to its initial state. The provision of a watchdog timer 301 insures that the microprocessor 303 does not reach a place in its program where it would remain indefinitely.

The microprocessor 303 receives via PIA 306 information from the sequence controller and digital filter. The information sensed by the PIA 306 includes the FIFO DATA VALID signal from flip-flop 310, three PCM channel number signals and five PCM channel address signals. PIA 306 also provides output signals from the microprocessor 303 for shifting and disabling the FIFO memory 307 and for resetting flip-flop 310.

The signal processing microcomputer processes the six tone energy estimates and the total energy estimate read out from the FIFO memory 307 according to the process depicted in the flow chart of FIG. 7. The flow chart of FIG. 7 details a process for recognizing MF tone pairs, which may be part of a series of MF digits representing a dialed telephone number or supervisory signalling. Each energy estimate stored in the FIFO memory 307 is an eight bit word, comprised of the eight high order bits of the sixteen-bit digital filter output signal.

The signal processing microcomputer may be normally occupied with the processing of information unrelated to tone detection. Once every 2.5 milliseconds, the signal processing microcomputer is interrupted in response to the 2.5 MS INTERRUPT signal and may proceed to process tone energy estimates according to the flow chart of FIG. 7. Since the signal processing microcomputer does not require tone energy estimates until it is interrupted, the FIFO DATA REQUEST signal is provided with a logical zero state, preventing the loading of energy estimates into the FIFO 307. Once an interrupt is generated in response to the 2.5 MS INTERRUPT signal, the signal processing microcomputer provides a logical high state on the FIFO DATA REQUEST signal to obtain new energy estimates. Thus, new energy estimates are read from the FIFO memory 307 only once every 2.5 milliseconds.

According to yet another feature of the present invention, since the signal processing microcomputer has sufficient capacity to process energy estimates from several pairs of sequence controllers and digital filters, additional blocks 315, including a PIA 306, a FIFO memory 307 and FIFO DATA VALID circuitry 308-312 may be coupled to MPU 303 for each additional sequence controller and digital filter pair. Thus, one signal processing microcomputer may essentially simultaneously serve several pairs of sequence controllers and digital filters.

Referring to block 701 in FIG. 7, the signal processing microcomputer, after providing the FIFO DATA REQUEST signal, continuously monitors the FIFO DATA VALID signal from flip-flop 310 for a logical high state, indicating that new energy estimates are available. When the FIFO DATA VALID signal has a logical high state, the microcomputer compares the newly received energy estimates for each tone to a predetermined minimum level, and increments a variable T by one for each tone energy estimate that is greater than the predetermined magnitude. If the variable T is greater than or equal to one, program control proceeds to block 702 where a 10 millisecond digit timer is set. The 10 millisecond period of the digit timer is determined by counting four interrupts.

Proceeding to block 703, if, in response to newly received tone energy estimates, the variable T is still less than or equal to one, program control proceeds to block 704. In block 704, a second timer is set that checks to make sure that a second tone is detected within 7.5 milliseconds of the receipt of the first tone. Thus, in order for program control to pass back to block 703, the variable T must be greater than or equal to two, indicating receipt of a second tone prior to the time out of the 7.5 millisecond timer. If the 7.5 millisecond timer times out, program control proceeds to block 705 where an error is indicated, after which program control proceeds back to block 701.

Once the variable T becomes greater than or equal to two and the 10 millisecond timer of block 703 has timed out, program control proceeds to block 706 where a 20 millisecond timer is set. If, during the 20 millisecond time interval, the variable T is reduced to be less than or equal to one in response to newly received energy estimates, program control proceeds to block 707. In block 707, a ten millisecond timer is set for timing transients. If the variable T is not greater than or equal to two at the end of the ten millisecond time interval, program control proceeds to block 708 for indicating an error, after which program control returns to block 701. If the transient disappears and the varible T becomes greater than or equal to two again before the ten millisecond timer times out, program control proceeds back to block 706. Once the 20 millisecond timer of block 706 has timed out, program control proceeds to block 709.

In order to have reached block 709, there must have been at least two tones detected within 7.5 milliseconds of one another, the first of which has been present for at least 30 milliseconds. Next, the energy estimates of the detected tones are checked to insure that they are within the range of −6 dbm to −24 dbm, or a range of 18 db. This check is made by the microcomputer by loading the energy estimate for each tone into an operating register and performing three left shifts, while testing the most significant bit of the operating register after each left shift. If the most significant bit is a logical one, the energy estimates are within the proper range, since each left shift is representative of a decrease in signal level of 6 db.

Next, the variable T must be exactly equal to two, indicating that only two tones are present. If more or less than two tones are present, an error is indicated at block 710, after which program control proceeds to block 701.

Next, the twist between the two detected tones is tested by verifying that the two tones are within 6 db of each other. This check is performed by the microcomputer by loading the largest energy estimate into an operating register, performing one right shift to divide the largest energy estimate by two, and subtracting the largest energy estimate divided by two from the second largest energy estimate. The detected tones are within 6 db of one another if one-half of the largest energy estimate subtracted from the second largest energy estimate is greater than or equal to zero.

A final check is performed on all other tone energy estimates to insure that they are less than −24 dbm. This check is performed similar to the others, in that the microcomputer loads the energy estimates into an operating register and performs three left shifts, during which the most significant bit of the operating register must be a logical zero. If any of these checks fail, program control proceeds to block 710 where an error is indicated, after which program control proceeds back to block 701.

If all of the checks made in block 709 have been successful, program control proceeds to block 711. The signal processing microcomputer waits at block 711 until the two detected tones disappear. Once the variable T becomes less than one, program control proceeds to block 712 where a 20 millisecond interdigit timer is set. Program control then proceeds to block 713, where, once the 20 millisecond interdigit timer has timed out, program control proceeds to block 714. At block 714, an output word is formed that indicates the particular MF digit corresponding to the detected pair of tones. The output word may be loaded by the signal processing microcomputer into the output register 305 of FIG. 3A for transmission to other computers or microcomputers for further processing. For example, other computers may accumulate a series of MF digits, which represent a dialed telephone number. The variable T is then reset to zero, and program control proceeds to block 701 for reception of the next MF digit.

Utilizing the foregoing description together with the flow chart of FIG. 7, one skilled in the programming art may readily code a program for implementing in a suitable programming language the steps called for at each of the blocks of the flow chart. For example, the flow chart may be essentially directly transformed into program steps using conventional conversational programming languages, such as the BASIC programming language. A sample program coded in BASIC language from the flow chart of FIG. 7 is included herewith in the Appendix. Once the program has been coded, a commercially available assembler for the signal processing microcomputer can then be utilized to transform the coded program into the proper machine language instructions. For example, assemblers and other support software are readily available for conventional microcomputers, such as the Motorola M6800 microcomputer.

In summary, a novel tone receiver has been described which can be utilized to detect simultaneous tone signals in a sampled digital signal. For example, the tone receiver of the present invention may be utilized in a PCM communication system for detecting multifrequency tone signalling in a PCM signal, or in any system where it is necessary to simultaneously detect two or more tone signals in an analog or digital signal. The tone receiver further includes a signal processing microcomputer, which, when properly programmed, will indicate that a particular multifrequency tone pair has been detected. The inventive tone receiver utilizes a system architecture that includes a microprogrammed sequence controller and a digital filter arranged such that the digital filter operates asynchronously from the sequence controller. Moreover, the inventive tone receiver can be programmed to implement, for each sample of a digital signal, a variable number of cascaded filters of variable order for each of a plurality of tone signals.

APPENDIX

The following program has been coded from the flow chart of FIG. 7 in BASIC programming language, which is described in the book entitled *Basic BASIC*, by James S. Coan, published by the Hayden Book Co., Inc., Rochelle Park, N.J., 1970. The program is included to demonstrate that the flow chart of FIG. 7 may be readily coded into any suitable programming language.

```
           REM ROUTINE FOR TONE DETECTION
           MINMAG=18
INT    FIFO DATREQ=1
600        READ DATVAL
           ON DATVAL=0 to 600
           LET T=0, I=0
           FOR I=1 TO 7
           READ TONE(I)
```

```
           REM ROUTINE FOR TONE DETECTION
           ON TONE(I)<MINMAG TO 10
           T=T+1
10         NEXT I
           READ TONE(8)
           ON TIMER1<>0 TO 703
           ON TIMER3<>0 TO 706
           ON TIMER5<>0 TO 711
           ON T<1 TO 760
702        TIMER1=4
           T>=2 TO 760
           TIMER2=3
           GO TO 760
703        TIMER1=TIMER1-1
           ON TIMER2<>0 TO 704
           ON T>=2 AND TIMER1=0 TO 20
           ON TIMER1=0 TO 705
           GO TO 760
20         TIMER3=8
           GO TO 760
704        TIMER2=TIMER2-1
           ON T<2 TO 30
           TIMER2=0
           GO TO 760
30         ON TIMER2=0 TO 705
           GO TO 760
706        TIMER3=TIMER3-1
           ON TIMER4<>0 TO 707
           ON T>=2 TO 40
           TIMER4=4
40         ON TIMER3=0 TO 709
           GO TO 760
707        TIMER4=TIMER4-1
           ON T<2 TO 50
           TIMER4=0
           ON TIMER3=0 TO 709
           GO TO 760
50         ON TIMER3=0 TO 708
           ON TIMER4=0 TO 708
           GO TO 760
709        ON T<>2 TO 710
           LET I=0, K=0
           FOR I=1 TO 7
           ON TONE(I)>TONE(8) TO 722
           ON TONE(I)<MINMAG TO 70
           K=K+1
           KTONE(K)=I
70         NEXT I
           ON K<>2 TO 710
           ON KTONE(1)<KTONE(2) TO 75
           ON (KTONE(2)-(KTONE(1)/2))<0 TO 724
           GO TO 80
75         ON (KTONE(1)-(KTONE(2)/2))<0 TO 724
80         TIMER5=8
           GO TO 760
711        ON T>=1 TO 712
           TIMER5=TIMER5-1
           ON TIMER5=0 TO 714
           GO TO 760
705        PRINT "SKEW ERROR"
           GO TO 750
708        PRINT "HIT ERROR"
           GO TO 750
710        PRINT "MULTIPLE TONE ERROR"
           GO TO 750
712        TIMER5=8
           GO TO 760
714        PRINT "TONES DETECTED", (KTONE(I), I=1 TO 2)
           GO TO 750
722        PRINT "TONE ENERGY ERROR"
           GO TO 750
724        PRINT "TWIST ERROR"
750        TIMER1=0, TIMER2=0, TIMER3=0, TIMER4=0,
           TIMER5=0
760        DATAREQ=0
           RETURN
```

We claim:

1. Apparatus for filtering an input signal comprised of digitally coded samples, said filtering apparatus comprising:

digital filter means responsive to a filter start signal for receiving each digitally coded sample of the input signal and performing an M-order filtering operation selected by select signals, where M is an integer number greater than one; said digital filter means providing an output signal and a filter done signal upon completion of the selected M-order filtering operation; and sequence control means responsive to each digitally coded sample for generating a sequence of control signals including filter start signals and select signals for successively applying the sample to the digital filter means and enabling the digital filter means to perform K cascaded M-order filtering operations, where K is an integer number greater than one, the sequence of control signals further including a halt signal after each filter start signal, and the sequence control means being disabled by the halt signal and subsequently re-enabled by the filter done signal.

2. The filtering apparatus according to claim 1, wherein said sequence control means further includes means for detecting a predetermined state of the digital filter output signal and means for branching to a predetermined one of the control signals in response to detection of the predetermined state of the digital filter output signal by the detecting means.

3. The filtering apparatus according to claim 2, wherein the detecting means detects negative digital filter output signals.

4. The filtering apparatus according to claim 2, wherein the detecting means detects digital filter output signals having a magnitude greater than a predetermined maximum magnitude and digital filter output signals having a magnitude less than a predetermined minimum magnitude.

5. The filtering apparatus according to claim 2, wherein said sequence control means includes:

means for providing a clock signal;

address counting means responsive to the clock signal for providing sequential address signals when enabled, said address counting means being enabled by receipt of each sample of the input signal, enabled by the filter done signal and disabled by the halt signal, said address counting means further being responsive to the branching means for providing address signals corresponding to said predetermined one of the control signals;

instruction memory means for storing the sequence of control signals, the control signals being read out from locations addressed by the address signals from the address counting means; and instruction register means responsive to the clock signal for receiving the read-out control signals.

6. The filtering apparatus according to claim 5, wherein the last control signal of the sequence of control signals is a reset signal, said address counting means responsive to the reset signal for providing a predetermined initial state of the address signals.

7. The filtering apparatus according to claim 5, wherein said digital filter means includes:

(i) M+1 shift register means for storing successive samples and M recursive signals, each sample and recursive signal having J bits, where J is an integer number greater than one;

(ii) coefficient memory means for storing $2^{M+1}$ predetermined coefficient signals, said coefficient memory means coupled to the M+1 shift register means for reading out the coefficient signals addressed by the filter select signals and the M+1 shift register means;

(iii) accumulating means including accumulator register means for storing an accumulator signal and further including adding means for adding the read-out coefficient signals to the stored accumulator signal divided by two and storing the result in the accumulator register means; and (iv) filter control means responsive to each filter start signal for enabling the M+1 shift register means to shift J times and the accumulator means to perform J corresponding accumulating operations, said filter control means further providing the filter done signal and providing the accumulator signal as the filter output signal upon completion of the J shifting and accumulating operations.

8. The filtering apparatus according to claim 2, further adapted to filter the digitally coded samples according to N different frequency passbands, said sequence control means further being responsive to each digitally coded sample for providing a sequence of control signals including further start signals and select signals for applying successive samples to the digital filter means and enabling the digital filter means to perform K cascaded M-order filtering operations for each of the N frequency passbands.

9. Apparatus for filtering an input signal comprised of digitally coded samples, said filtering apparatus comprising:

digital filter means responsive to a filter start signal for receiving each digitally coded sample of the input signal and performing an M-order filtering operation selected by select signals, where M is an integer number greater than one; said digital filter means provided an output signal and a filter done signal upon completion of the selected M-order filtering operation;

means for detecting a predetermined state of the digital filter output signal; and sequence control means responsive to each digitally coded sample for generating a sequence of control signals including filter start signals and select signals for successively applying the sample to the digital filter means and enabling the digital filter means to perform K cascaded M-order filtering operations, where K is an integer number greater than one, the sequence of control signals further including a halt signal after each filter start signal, the sequence control means being disabled by the halt signal and subsequently re-enabled by the filter done signal, and said sequence control means further including means for branching to a predetermined one of the control signals in response to detection of the predetermined state of the digital filter output signal by the detecting means.

10. The filtering apparatus according to claim 9, wherein the detecting means detects negative digital filter output signals.

11. The filtering apparatus according to claim 9, wherein the detecting means detects digital filter output signals having a magnitude greater than a predetermined maximum magnitude and digital filter output signals having a magnitude less than a predetermined minimum magnitude.

12. Apparatus for detecting the presence of N predetermined tone signals in an input signal comprised of digitally coded samples, where N is an integer number greater than one, said tone detecting apparatus comprising:
   digital filter means responsive to a filter start signal for receiving each digitally coded sample of the input signal and performing an M-order filtering operation selected by select signals, where M is an integer number greater than one; said digital filter means providing an output signal and a filter done signal upon completion of the selected M-order filtering operation;
   memory means responsive to a memory load signal for storing the digital filter output signal;
   sequence control means responsive to each digitally coded sample for generating a sequence of control signals including filter start signals and select signals for successively applying the sample to the digital filter means and enabling the digital filter means to perform K cascaded M-order filtering operations for each of the N tone signals, where K is an integer number greater than one, the sequence of control signals further including a halt signal after each filter start signal, the memory load signal after the control signals for the K cascaded filtering operations for each tone signal, and a data valid signal after the control signals for the K cascaded filter operations for all N tones, said sequence control means being disabled by the halt signal and subsequently re-enabled by the filter done signal; and
   processing means responsive to the data valid signal for reading out each of the digital filter output signals stored in the memory means, comparing the magnitude of the respective read-out output signals to a predetermined magnitude and providing an indication signal indicating that a corresponding tone signal is present when the magnitude of the read-out output signal is greater than the predetermined magnitude.

13. The tone detecting apparatus according to claim 12, wherein at least one of said K cascaded filtering operations is a low pass filtering operation, said sequence of control signals further including a rectify signal during the low pass filtering operation, and said digital filter means further including means that is responsive to the rectify signal for converting a negative sample to a positive sample.

14. The tone detecting apparatus according to claim 13, wherein each sample includes a sign bit and a plurality of data bits and said converting means of the digital filter means includes: gating means coupled to the rectify signal and the sign bit of the sample for providing a pulse signal when a sample is negative; memory means for storing the pulse signal; and means for logically complementing the sample in response to the stored pulse signal.

15. The tone detecting apparatus according to claim 14, wherein said sequence control means provides a rectify clearing signal in response to the filter done signal for clearing the stored pulse signal from the pulse signal memory means.

16. The tone detecting apparatus according to claim 14, wherein said pulse signal memory means includes means for clearing the stored pulse signal in response to the filter done signal.

17. The tone detecting apparatus according to claim 12, wherein said memory means comprises first-in first-out memory means, and said sequence control means includes:
   means for providing a clock signal;
   address counting means responsive to the clock signal for providing sequential address signals;
   instruction memory means for storing the sequence of control signals, said control signals being read out from locations addressed by the address signals from the address counting means; and
   instruction register means responsive to the clock signal for receiving the read-out control signals.

18. The tone detecting apparatus according to claim 17, wherein said sequence control means further includes means for disabling the address counting means from counting in response to the halt signal and subsequently re-enabling the address counting means in response to the filter done signal.

19. The tone detecting apparatus according to claims 17 or 18, wherein said sequence control means further includes means for resetting the address counting means to a predetermined initial state in response to the data valid signal.

20. The tone detecting apparatus according to claim 19, wherein said digital filter means includes:
   (i) M+1 shift register means for storing successive sample and M recursive signals, each sample and recursive signal having J bits, where J is an integer number greater than one;
   (ii) coefficient memory means for storing $2^{M+1}$ predetermined coefficient signals for each tone signal, said coefficient memory means coupled to the M+1 shift register means for reading out the coefficient signals addressed by the filter select signals and the M+1 shift register means;
   (iii) accumulating means including accumulator register means for storing an accumulator signal and further including adding means for adding the read-out coefficient signals to the stored accumulator signal divided by two and storing the result in the accumulator register means; and
   (iv) filter control means responsive to each filter start signal for enabling the M+1 shift register means to shift J times and the accumulator means to perform J corresponding accumulating operations, said filter control means further providing the filter done signal and providing the stored accumulator signal as the filter output signal upon completion of the J shifting and accumulating operations.

21. The tone detecting apparatus according to claim 12, wherein said sequence control means further generates control signals for providing an M-order, low pass filtering operation for providing a total energy signal having a magnitude that is proportional to the total energy of the digitally coded samples, said sequence control means further generating a rectify signal during the low pass filtering operation, and said digital filter means further including means that is responsive to the rectify signal for converting a negative sample to a positive sample.

22. The tone detecting apparatus according to claim 12 or 21, wherein said processing means further includes means for timing the presence of the indication signals and providing a corresponding two-tone detect signal if two indication signals are simultaneously present for at least a predetermined time interval.

23. The tone detecting apparatus according to claim 22, wherein said processing means further includes means for comparing the magnitude of the read-out output signals corresponding to said two simultaneously present indication signals and rejecting said two simultaneously present indication signals if the compared magnitudes differ from one another by more than a predetermined quantity.

24. The tone detecting apparatus according to claim 22, wherein said processing means further includes means for comparing the magnitude of read-out output signals which do not have a corresponding indication signal to a predetermined minimum magnitude and rejecting said two simultaneously present indication signals if any one of the compared magnitudes is greater than the predetermined minimum magnitude.

25. The tone detecting means according to claim 21, wherein said processing means is responsive to the data-valid signal for reading out the digital filter output signals and the total energy signal from the memory means, said processing means further comparing the magnitude of the read-out total energy signal to the magnitude of each of the read-out output signals and rejecting the read-out output signals if the magnitude of the total energy signal is greater than the magnitude of at least one of the read-out output signals.

26. Apparatus for detecting the presence of N predetermined tone signals in an input signal comprised of digitally coded samples, where N is an integer number greater than one, said tone detecting apparatus comprising:

digital filter means responsive to a filter start signal for receiving each digitally coded sample of the input signal and performing an M-order filtering operation selected by select signals, where M is an integer number greater than one; said digital filter means providing an output signal and a filter done signal upon completion of the selected M-order filtering operation;

first-in first-out (FIFO) memory means responsive to a memory load signal for storing the digital filter output signal;

sequence control means responsive to each digitally coded sample for generating a sequence of control signals including filter start signals and select signals for successively applying the sample to the digital filter means and enabling the digital filter means to perform K cascaded M-order filtering operations for each of the N tone signals, where K is an integer number greater than one, the sequence of control signals further including a halt signal after each filter start signal, the memory load signal after the control signals for the K cascaded filter operations for each tone signal and a reset signal after the control signals for the K cascaded filter operations for all N tones, said sequence control means being disabled by the halt signal and subsequently re-enabled by the filter done signal;

control means responsive to a data request signal and the reset signal for providing a data valid signal;

means for generating successive interrupt signals separated from one another by a predetermined time interval; and processing means responsive to each interrupt signal for providing the data request signal and thereafter responsive to the data valid signal for reading out each of the digital filter output signals stored in the FIFO memory means, comparing the magnitude of each of the respective read-out output signals to a predetermined magnitude and providing an indication signal indicating that a corresponding tone signal is present when the magnitude of the read-out output signal is greater than the predetermined magnitude.

27. The tone detecting apparatus according to claim 26, wherein the sequence control means includes:

means for providing a clock signal;

address counting means responsive to the clock signal for providing sequential address signals;

instruction memory means for storing the sequence of control signals, said control signals being read out from locations addressed by the address signals from the address counting means; and instruction register means responsive to the clock signal for receiving the read-out control signals.

28. The tone detecting apparatus according to claim 27, wherein said digital filter means includes:

(i) $M+1$ shift register means for storing successive samples and M recursive signals, each sample and recursive signal having J bits, where J is an integer number greater than one;

(ii) coefficient memory means for storing $2^{M+1}$ predetermined coefficient signals for each tone signal, said coefficient memory means coupled to the $M+1$ shift register means for reading out the coefficient signals addressed by the filter select signals and the $M+1$ shift register means;

(iii) accumulating means including accumulator register means for storing an accumulator signal and further including adding means for adding the read-out coefficient signals to the stored accumulator signal divided by two and storing the result in the accumulator register means; and (iv) filter control means responsive to each filter start signal for enabling the $M+1$ shift register means to shift J times and the accumulator means to perform J corresponding accumulating operations, said filter control means further providing the filter done signal and providing the stored accumulator signal as the filter output signal upon completion of the J shifting and accumulating operations.

29. Apparatus for detecting the presence of N tone signals in an input signal comprised of digitally coded samples each having J bits, where N and J are integer numbers greater than one, said tone detecting apparatus comprising:

(a) M-order digital filter means responsive to a filter start signal for receiving each digitally coded sample of the input signal and M recursive signals and performing an M-order filtering operation selected by select signals, where M is an integer number greater than one, said digital filer means including:

(i) $M+1$ shift register means for storing successive digitally coded samples of the input signal and M recursive signals, each sample and recursive signal having J bits;

(ii) coefficient memory means for storing $2^{M+1}$ predetermined coefficient signals for each tone signal, said coefficient memory means coupled to the $M+1$ shift register means for reading out the coefficient signals addressed by the filter select signals and the $M+1$ shift register means;

(iii) accumulating means including accumulator register means for storing an accumulator signal and further including adding means for adding the read-out coefficient signals to the stored accumulator signal divided by two and storing the result in the accumulator register means; and (iv) filter control means responsive to the filter start signal for enabling the M+1 shift register means to shift J times and the accumulator means to perform J corresponding accumulating operations, said filter control means further providing a filter done signal and providing the stored accumulator signal as the filter output signal upon completion of the J shifting and accumulating operations;

(b) first-in first-out (FIFO) memory means responsive to a memory load signal for storing the digital filter output signal;

(c) sequence control means responsive to each digitally coded sample for generating a sequence of control signals including filter start signals and select signals for successively applying the sample and recursive signals to the digital filter means and enabling the digital filter means to perform K cascaded M-order filtering operations for each of the N tone signals, where K is an integer number greater than one, the sequence of control signals further including a halt signal after each filter start signal, the memory load signal after the control signals for the K cascaded filtering operations for each tone signal, and a reset signal after the control signals for the K cascaded filtering operations for all N tone signals, said sequence control means including:

(i) input register means for receiving successive digitally coded samples;

(ii) means for providing a clock signal;

(iii) address counting means responsive to the clock signal for providing sequential address signals when enabled, said address counting means enabled by receipt of each sample of the input signal, enabled by the filter done signal, and disabled by the halt signal, and said address counting means further responsive to the reset signal for providing a predetermined initial state;

(iv) partial results memory means responsive to the memory load signal for storing for each M-order filter operation the M recursive signals at locations addressed by the select signals, the stored recursive signals being read out from locations addressed by the select signals in the absence of the memory load signal;

(v) instruction memory means for storing the sequence of control signals, said control signals being read out from locations addressed by the address signals from the address counting means; and (vi) instruction register means responsive to the clock signal for receiving the read-out control signals;

(d) control means responsive to a data request signal and the reset signal for providing a data valid signal;

(e) means for generating successive interrupt signals separated from one another by a predetermined time interval;

and (f) processing means responsive to each interrupt signal for providing a data request signal and thereafter responsive to the data valid signal for reading out each of the digital filter output signals stored in the FIFO memory means, comparing the magnitude of each read-out output signal to the predetermined magnitude and providing an indication signal indicating that a corresponding tone signal is present when the magnitude of the read-out output signal is greater than the predetermined magnitude.

30. The tone detecting apparatus according to claim 29, wherein at least one of said K cascaded filtering operations is a low pass filtering operation, said sequence of control signals further including a rectify signal during the low pass filtering operation, and said digital filter means further including means that is responsive to the rectify signal for converting a negative sample to a positive sample.

31. The tone detecting apparatus according to claim 30, wherein each sample includes a sign bit and a plurality of data bits and said converting means of the digital filter means includes: gating means coupled to the rectify signal and the sign bit of the sample for providing a pulse signal when a sample is negative; memory means for storing the pulse signal; and means for logically complementing the sample in response to the stored pulse signal.

32. The tone detecting apparatus according to claim 31, wherein said sequence control means provides a rectify clearing signal in response to the filter done signal for clearing the stored pulse signal from the pulse signal memory means.

33. The tone detecting apparatus according to claim 31, wherein said pulse signal memory means includes means for clearing the stored pulse signal in response to the filter done signal.

34. The tone detecting apparatus according to claim 29, wherein said digital filter means further includes means responsive to the accumulator signals for detecting when the accumulator signal is greater than a predetermined maximum magnitude and clamping the accumulator signal to the predetermined maximum magnitude and detecting when the accumulator signal is less than a predetermined minimum magnitude and clamping the accumulator signal to the predetermined minimum magnitude.

35. The tone detecting apparatus according to claim 34, wherein said detecting means includes means for truncating three high order bits from the accumulator signal and means responsive to the three high order bits for clamping the accumulator signal to the predetermined maximum magnitude when the most significant bit has a logical zero state and two of the three high order bits have different logical states and clamping the accumulator signal to the predetermined minimum magnitude when the most significant bit has a logical one state and two of the three high order bits have different logical states.

36. The tone detecting apparatus according to claim 29, wherein said sequence control means further generates control signals for providing an M-order, low pass filtering operation for providing a total energy signal having a magnitude that is proportional to the total energy of digitally coded samples, said sequence control means further generating a rectify signal during the low pass filtering operation, and said digital filter means further including means that is responsive to the rectify signal for converting a negative sample to a positive sample.

37. The tone detecting apparatus according to claim 29, wherein the coefficient signals stored in said coefficient memory means are arranged in N blocks, each block containing the coefficient signals corresponding to the K cascaded filtering operations for one of the N tone signals.

38. The tone detecting apparatus according to claim 29, wherein the digitally coded samples are coded according to a predetermined companding format, and said sequence control means further includes expansion memory means interposed between the input register means and digital filter means for storing linearly coded samples of the compounded samples at locations addressed by the corresponding companded samples, the linearly coded sample being read out from locations of the expansion memory means addressed by the companded sample from the input register means.

39. The tone detecting apparatus according to claim 29 or 36, wherein said processing means further includes means for timing the presence of the indication signals and providing a corresponding two-tone detect signal if two indication signals are simultaneously present for at least a predetermined time interval.

40. The tone detecting apparatus according to claim 39, wherein said processing means further includes means for comparing the magnitude of the read-out output signals corresponding to said two simultaneously present indication signals and rejecting said two simultaneously present indication signals if the compared magnitudes differ from one another by more than a predetermined quantity.

41. The tone detecting apparatus according to claim 39, wherein said processing means further includes means for comparing the magnitude of read-out output signals which do not have a corresponding indication signal to a predetermined minimum magnitude and rejecting said two simultaneously present indication signals if any one of the compared magnitudes is greater than the predetermined minimum magnitude.

42. The tone detecting means according to claim 36, wherein said processing means is responsive to the data valid signal for reading out the digital filter output signals and the total energy signal from the FIFO memory means, said processing means further comparing the magnitude of the read-out total energy signal to the magnitude of each of the read-out output signals and rejecting the read-out output signals if the magnitude of the total energy signal is greater than the magnitude of at least one of the read-out output signals.

43. The tone detecting apparatus according to claim 29, wherein said digital filter means further includes first and second pipeline register means, the first pipeline register means interposed between the M+1 shift register means and the coefficient memory means for storing the coefficient address signals and M+1 bits serially shifted from the M+1 shift register means, and said second pipeline register means interposed between the coefficient memory means and the accumulating means for storing the read-out coefficient signals.

44. The tone detecting apparatus according to claim 29, wherein said digital filter means further includes gating means interposed between the coefficient memory means and the accumulating means for logically complementing the bits of the coefficient signals in response to an enable signal, said digital filter control means providing the enable signal during the Jth accumulating operation.

45. The tone detecting apparatus according to claim 44, wherein said digital filter control means further includes means for applying a carry bit to the adding means during the Jth accumulating operation.

46. Apparatus for detecting the presence of N predetermined tone signals in first and second input signals comprised of digitally coded samples, where N is an integer number greater than one, said tone detecting apparatus comprising:
(a) first and second filter means adapted to filter the digitally coded samples of the first and second input signals, respectively, said first and second filter means each comprising:
 (i) digital filter means responsive to a filter start signal for receiving each digitally coded sample of the respective input signal and performing an M-order filtering operation selected by select signals, where M is an integer number greater than one; said first digital filter means providing an output signal and a filter done signal upon completion of the selected M-order filtering operation;
 (ii) memory means responsive to a memory load signal for storing the respective digital filter output signal; and
 (iii) sequence control means responsive to each digitally coded sample of the respective input signal for generating a sequence of control signals including filter start signals and select signals for successively applying samples of the respective input signal to the digital filter means and enabling the digital filter means to perform K cascaded M-order filtering operations for each of the N tone signals, where K is an integer number greater than one, said sequence of control signals including a halt signal after each filter start signal, the memory load signal after the control signals for the K cascaded filtering operations for each tone signal, and a data valid signal after the control signals for the K cascaded filter operations for all N tones, said sequence control means being disabled by the halt signal and subsequently re-enabled by the respective filter done signal; and
(b) processing means responsive to the data valid signal from the first and second filter means for reading out each of the digital filter output signals stored in the corresponding memory means, comparing the magnitude of each of the respective read-out output signals to a predetermined magnitude and providing an indication signal indicating that a corresponding tone signal is present when the magnitude of the read-out output signal is better than the predetermined magnitude.

47. A method of filtering an input signal comprised of digitally coded samples, said method comprising the steps of:
(a) generating a filter start signal in response to each sample of the input signal;
(b) applying the filter start signal and each sample of the input signal to digital filter means;
(c) performing by the digital filter means an M-order filtering operation on the applied sample, where M is an integer number greater than one;
(d) providing an output signal from the digital filter means when the M-order filter operation is completed; and
(e) generating a filter done signal when the M-order filtering operation is completed.

48. The method according to claim 47, further including the step (f) of generating a filter start signal in response to the filter done signal from previous step (e), the step (g) of applying the output signal from the previous step (d) to the digital filter means and the step of repeating steps (c), (d) and (e).

49. The method according to claim 47, wherein said performing step (c) further includes the step of generating select signals in response to each digitally coded sample, said performing step performing by the digital filter means an M-order filtering operation selected by the select signals.

50. The method according to claim 47, adapted to detect the presence of a predetermined tone signal in the input signal, said method further including the steps of:

(f) comparing the magnitude of the output signal from the digital filter means to a predetermined magnitude; and (g) generating an indication signal indicating that the tone signal is present when the magnitude of the output signal is greater than the predetermined magnitude.

51. The method according to claim 50, further including the step of repeating steps (a), (b), (c), (d), (e), (f) and (g) for detecting the presence of a second predetermined tone signal, and the step of generating a two-tone detect signal if the indication signal from previous step (g) and the indication signal from repeated step (g) are generated.

* * * * *

UNITED STATES PATENT AND TRADEMARK OFFICE
CERTIFICATE OF CORRECTION

PATENT NO. : 4,354,248
DATED : October 12th, 1982
INVENTOR(S) : David R.L. Conger, Ira A. Gerson and Richard E. White It is certified that error appears in the above—identified patent and that said Letters Patent is hereby corrected as shown below:

Claim 8, line 6 delete "further" and insert --filter--

Claim 20, line 4 delete first occurence of "sample" and insert --samples--

Signed and Sealed this

Twenty-first Day of December 1982

[SEAL]

Attest:

GERALD J. MOSSINGHOFF

Attesting Officer    Commissioner of Patents and Trademarks